United States Patent
Kawanishi et al.

(10) Patent No.: US 10,267,955 B2
(45) Date of Patent: Apr. 23, 2019

(54) OPTICAL SHEET, DISPLAY DEVICE, AND ELECTRONIC APPARATUS

(71) Applicant: Sony Corporation, Tokyo (JP)

(72) Inventors: Mitsuhiro Kawanishi, Tokyo (JP); Atsushi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/550,171

(22) PCT Filed: Dec. 16, 2015

(86) PCT No.: PCT/JP2015/085172
§ 371 (c)(1),
(2) Date: Aug. 10, 2017

(87) PCT Pub. No.: WO2016/132643
PCT Pub. Date: Aug. 25, 2016

(65) Prior Publication Data
US 2018/0045860 A1 Feb. 15, 2018

(30) Foreign Application Priority Data
Feb. 18, 2015 (JP) ................. 2015-029917

(51) Int. Cl.
*G02B 27/00* (2006.01)
*G02B 27/40* (2006.01)
(Continued)

(52) U.S. Cl.
CPC ............. *G02B 3/0068* (2013.01); *G02B 3/00* (2013.01); *G02B 3/0056* (2013.01);
(Continued)

(58) Field of Classification Search
CPC .............. G02B 3/0056; G02B 27/2214; G02B 3/0031; G02B 3/0043; G02B 3/005;
(Continued)

(56) References Cited

U.S. PATENT DOCUMENTS

| | | |
|---|---|---|
| 5,499,138 A | 3/1996 | Iba |
| 6,215,593 B1 | 4/2001 | Bruce |
| 2011/0317272 A1* | 12/2011 | Horikawa .......... G02B 27/0081 359/619 |

FOREIGN PATENT DOCUMENTS

| | | |
|---|---|---|
| JP | 5-328261 A | 12/1993 |
| JP | 2011-191594 A | 9/2011 |
| JP | 2011-221046 A | 11/2011 |

OTHER PUBLICATIONS

International Search Report and Written Opinion and English translation thereof dated Mar. 15, 2016 in connection with International Application No. PCT/JP2015/085172.
(Continued)

*Primary Examiner* — Evan P Dzierzynski
*Assistant Examiner* — Sharrief I Broome
(74) *Attorney, Agent, or Firm* — Wolf, Greenfield & Sacks, P.C.

(57) ABSTRACT

An optical sheet (1) includes a pinhole mask including a plurality of pinholes and a microlens array including a plurality of microlenses. Positions and sizes of the plurality of pinholes and the plurality of microlenses allow light emitted from the sub-pixels of all kinds to enter a specific pinhole and be diffracted by the specific pinhole, thereby allowing each thus-diffracted light outputted from the specific pinhole to enter a specific microlens.

15 Claims, 28 Drawing Sheets

(51) Int. Cl.
  *G02B 3/00*     (2006.01)
  *G02F 1/1335*   (2006.01)
  *G09F 9/00*     (2006.01)

(52) U.S. Cl.
  CPC ......... *G02B 27/0075* (2013.01); *G02B 27/40* (2013.01); *G02F 1/133504* (2013.01); *G02F 1/133526* (2013.01); *G09F 9/00* (2013.01)

(58) Field of Classification Search
  CPC .... G02B 3/0006; G02B 3/0062; G02B 27/06; G02B 27/0961; G02B 3/0037; G02B 3/0018; G02B 3/0068; G02B 3/0075; G02B 27/0927; G02B 19/0014; G02B 27/0025
  See application file for complete search history.

(56) References Cited

OTHER PUBLICATIONS

International Preliminary Report on Patentability and English translation thereof dated Aug. 31, 2017 in connection with International Application No. PCT/JP2015/085172.

\* cited by examiner

[ FIG. 1 ]
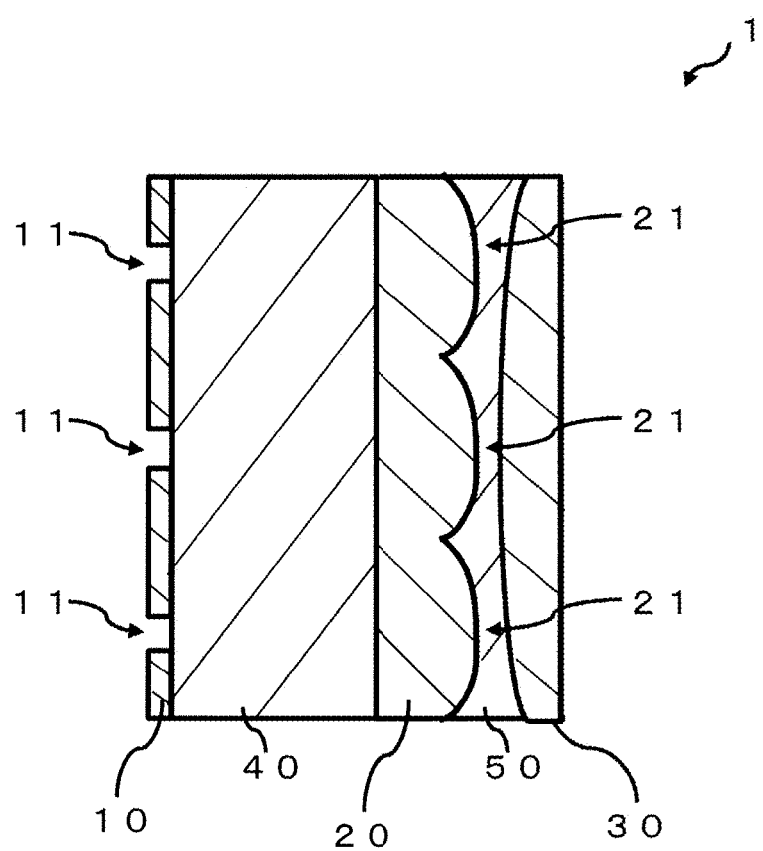

[ FIG. 2A ]
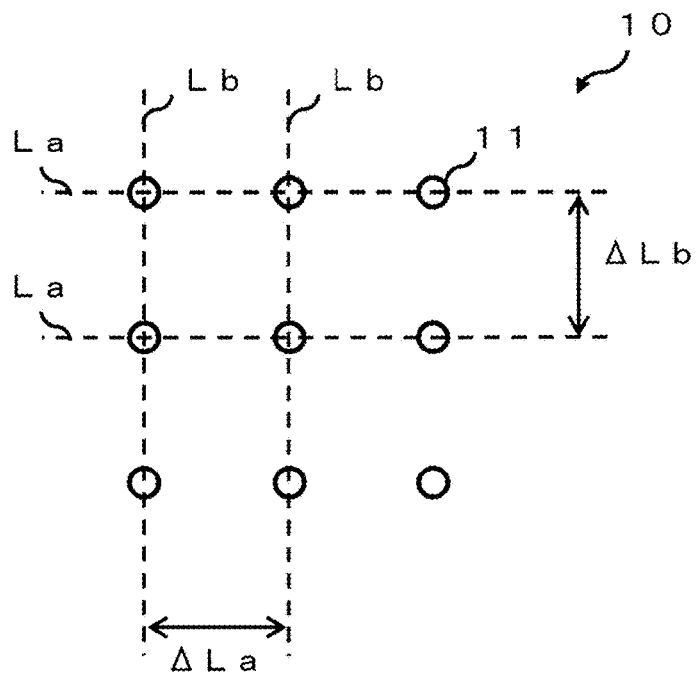
[ FIG. 2B ]
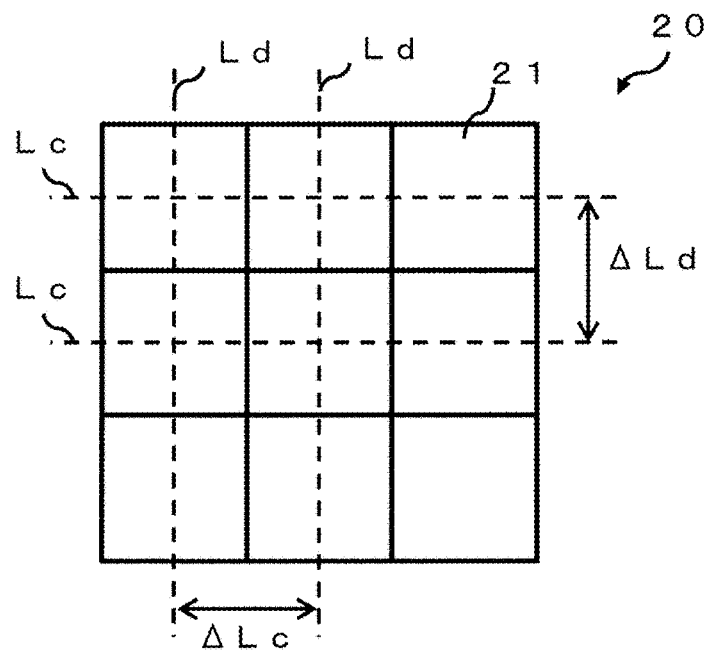

[ FIG. 2C ]
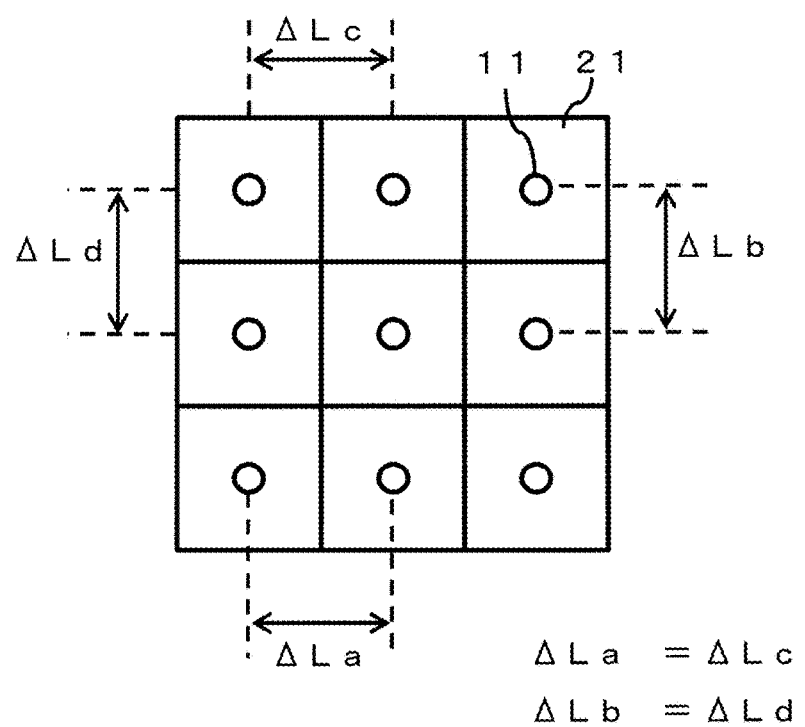

[ FIG. 3 ]
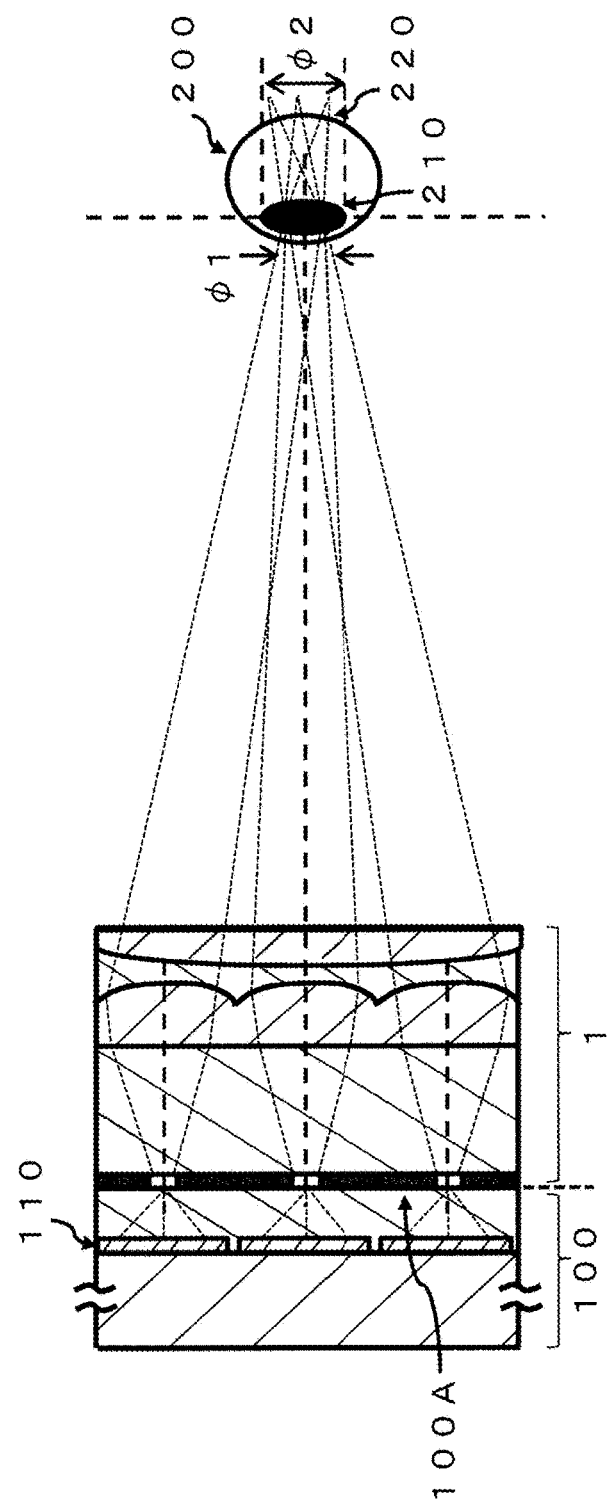

[ FIG. 4A ]
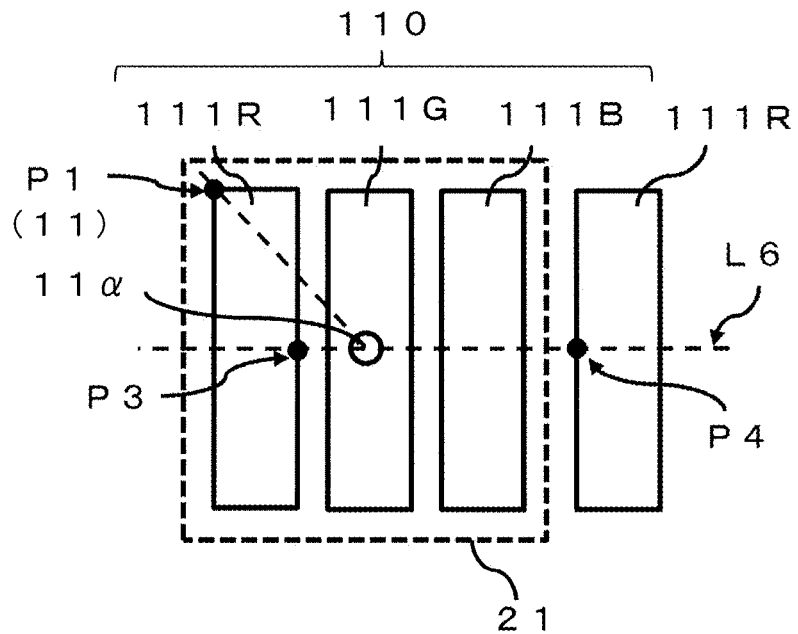
[ FIG. 4B ]
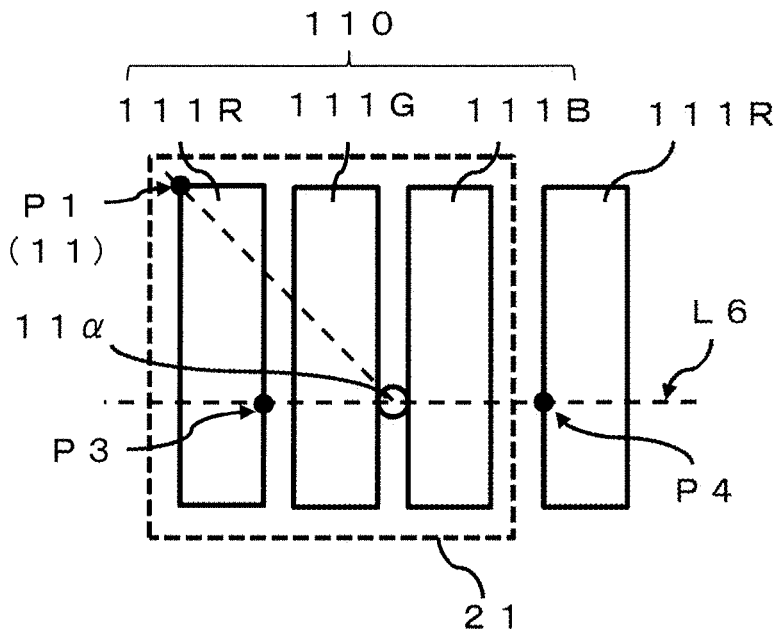

[FIG. 5]
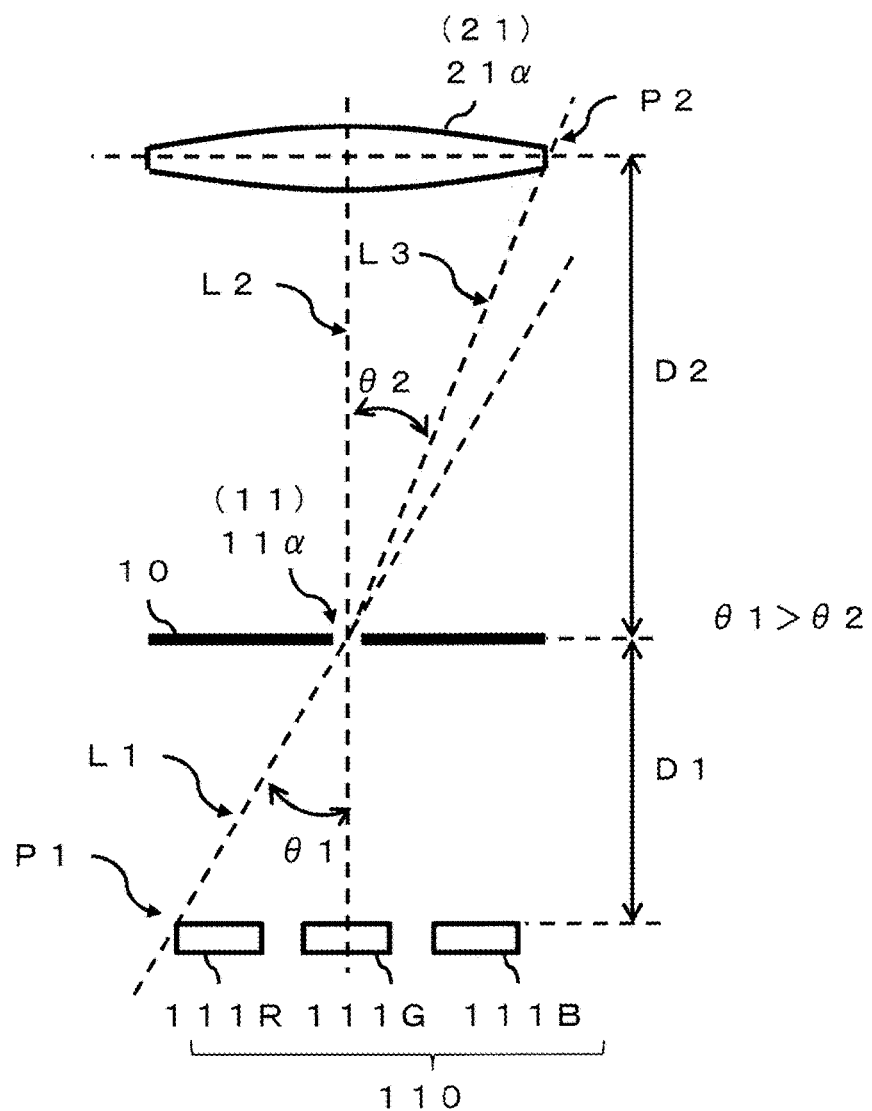

[ FIG. 6 ]
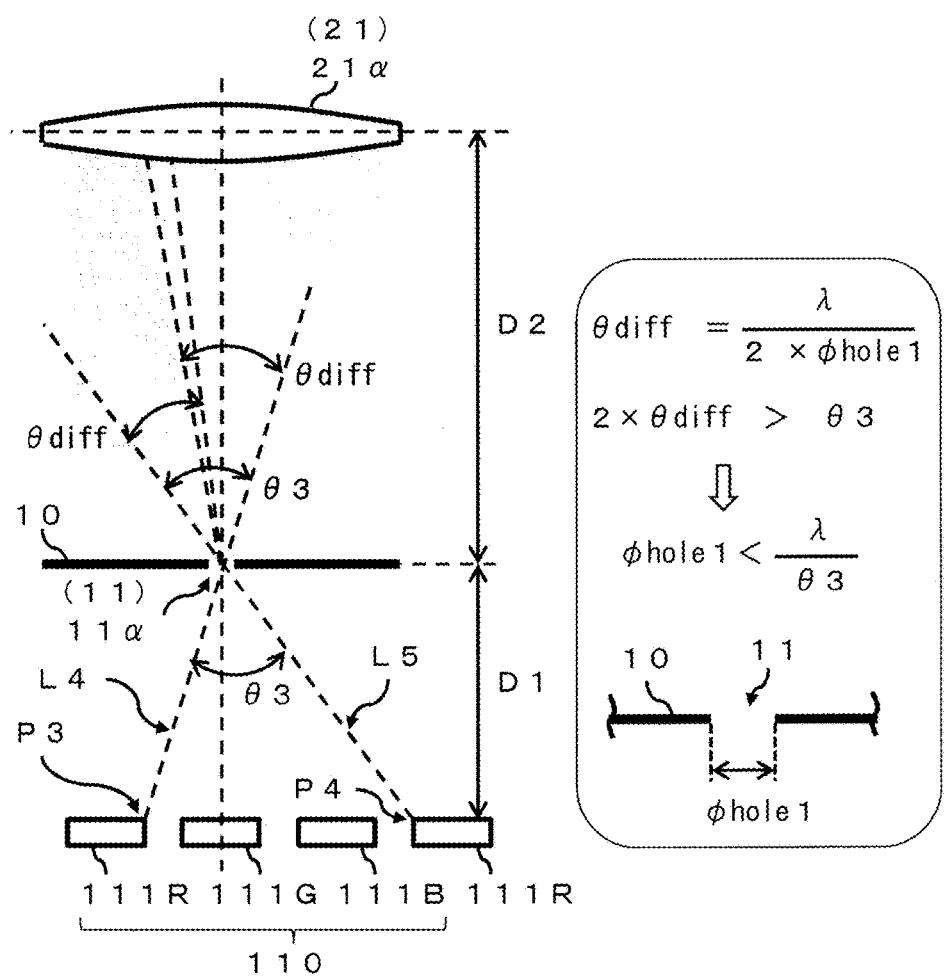

[ FIG. 7 ]
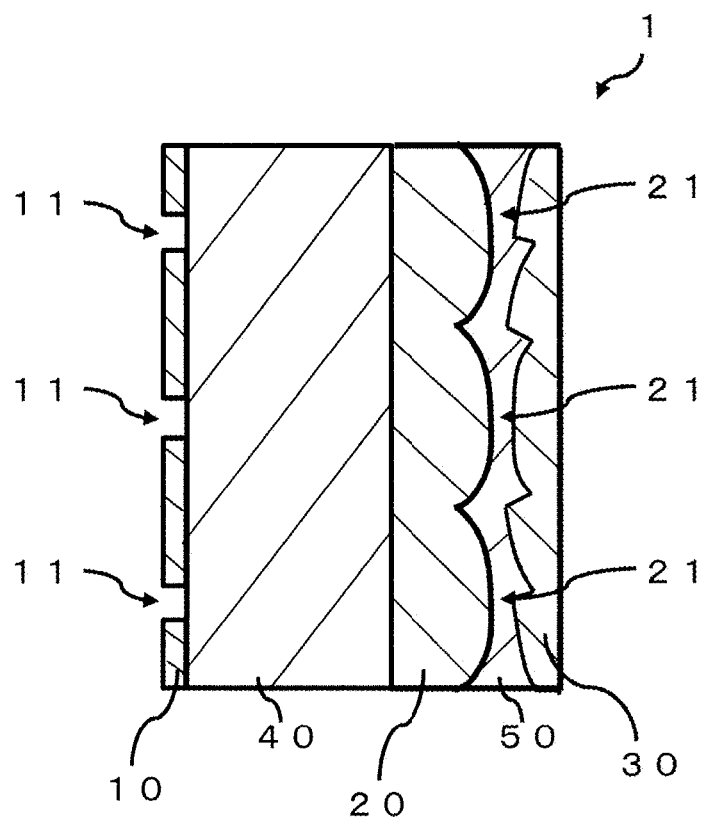

[ FIG. 8A ]
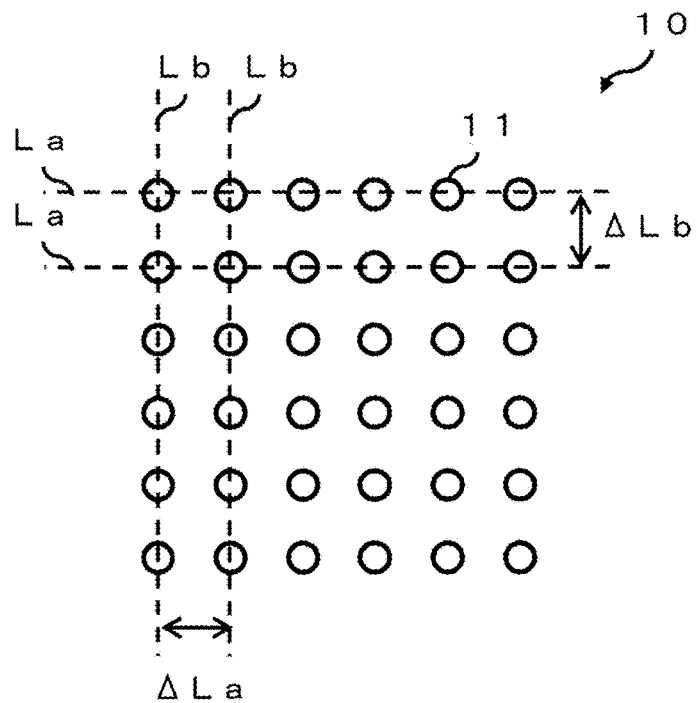
[ FIG. 8B ]
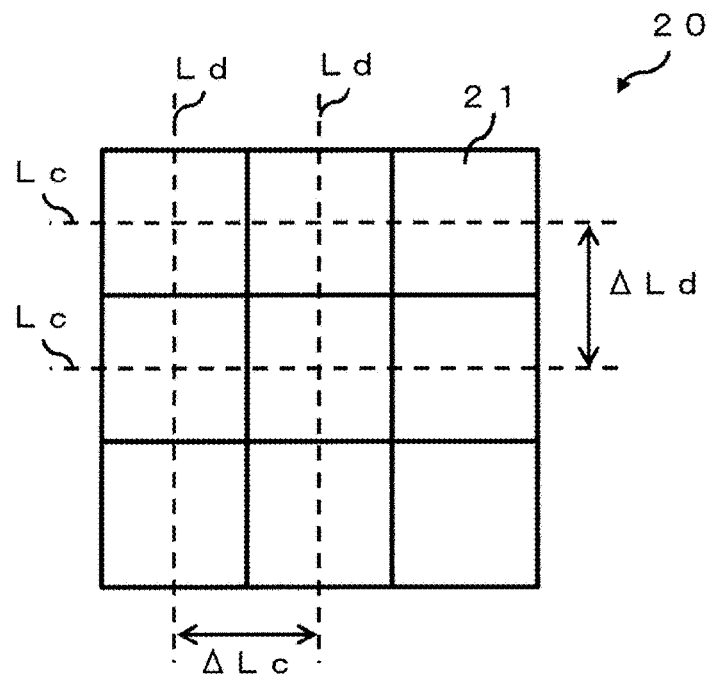

[ FIG. 8C ]
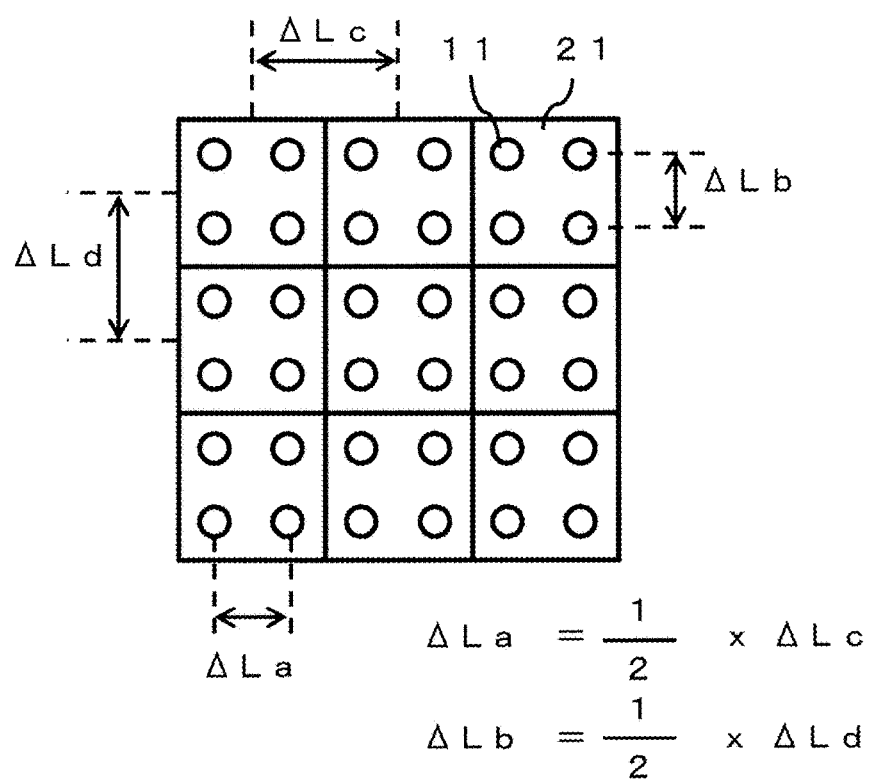

[ FIG. 9A ]
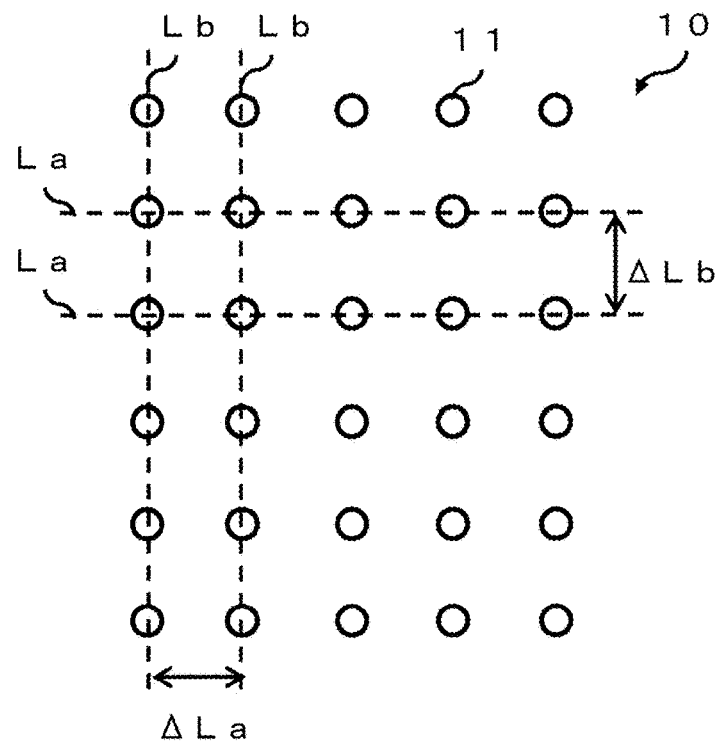
[ FIG. 9B ]
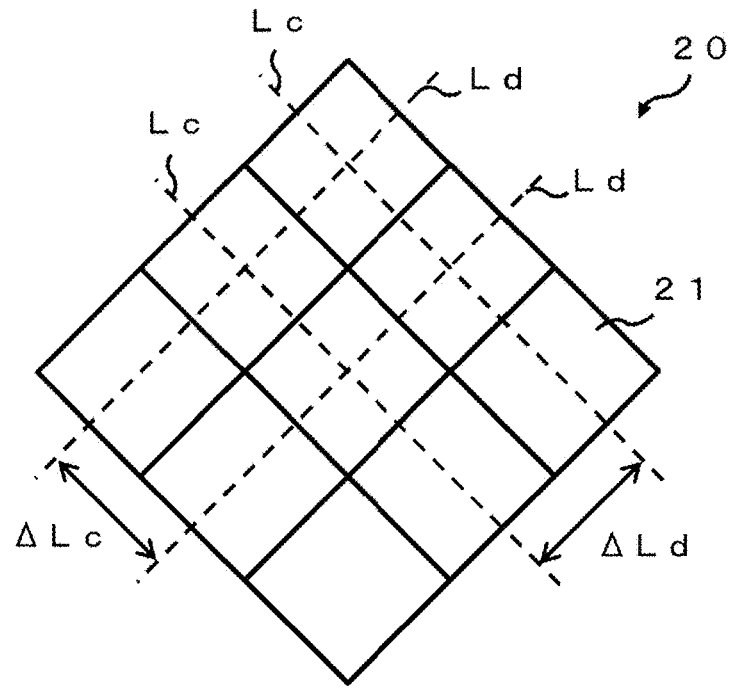

[ FIG. 9C ]
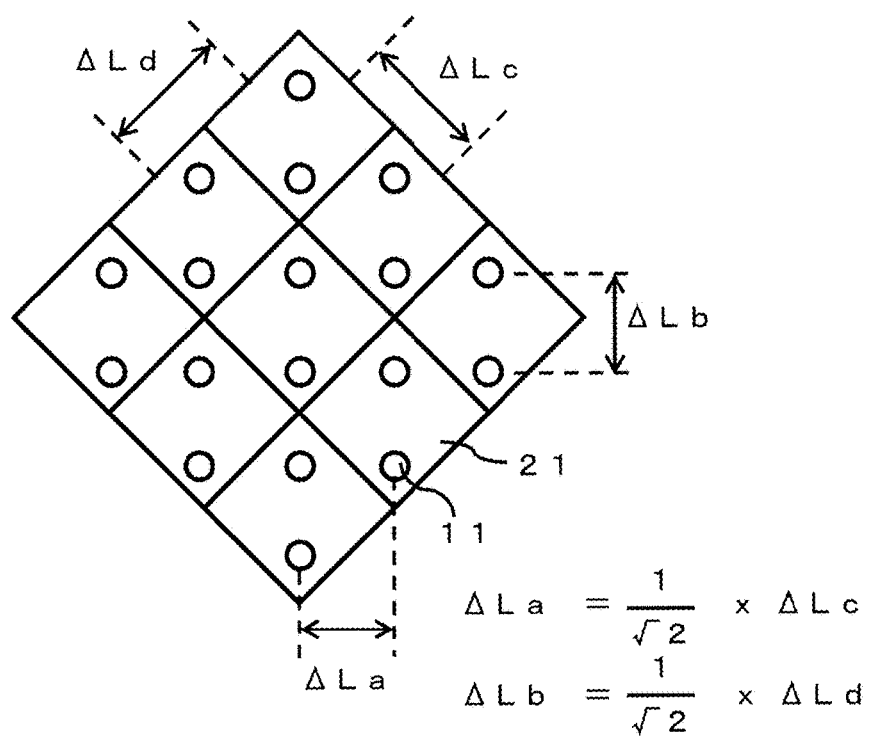

[ FIG. 10A ]
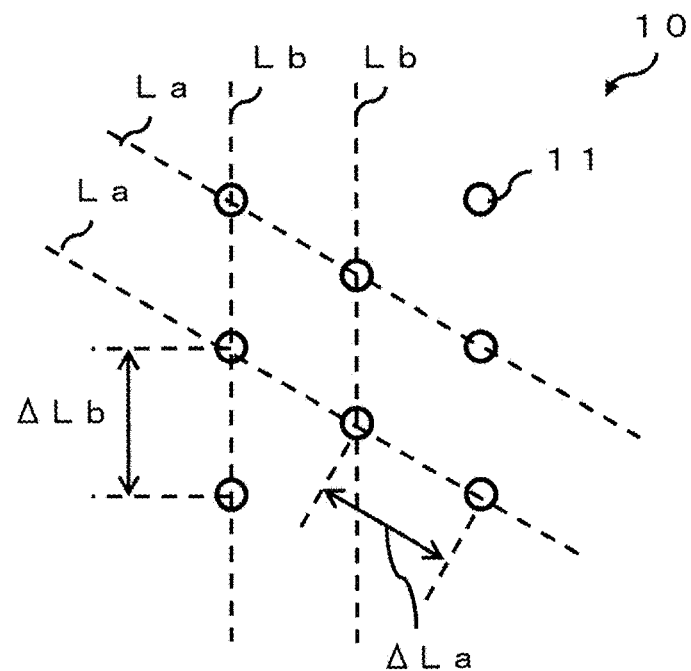
[ FIG. 10B ]
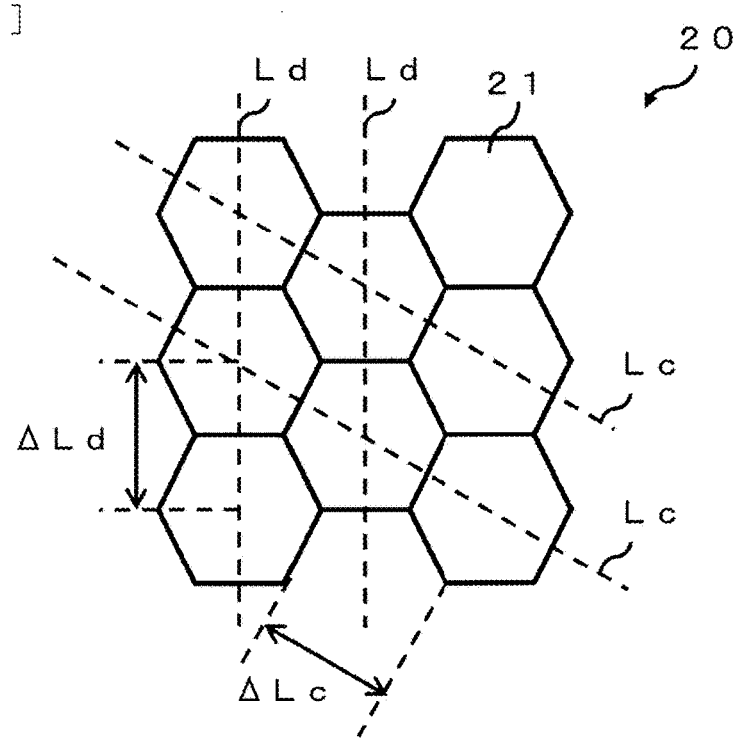

[ FIG. 10C ]
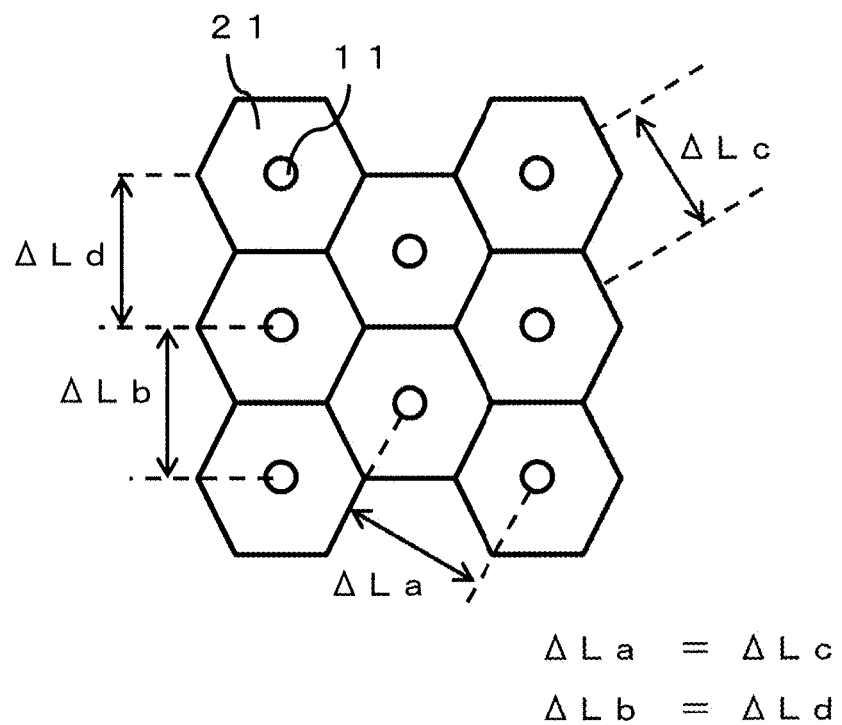

[ FIG. 11 ]
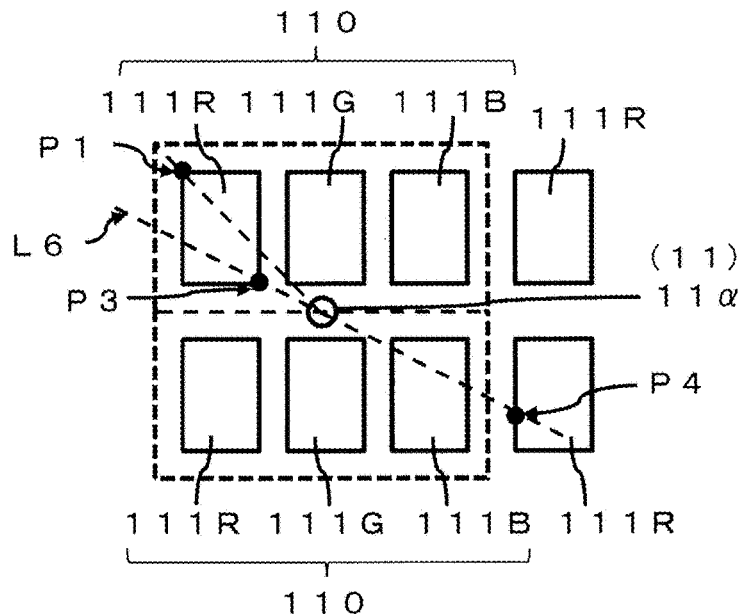
[ FIG. 12 ]
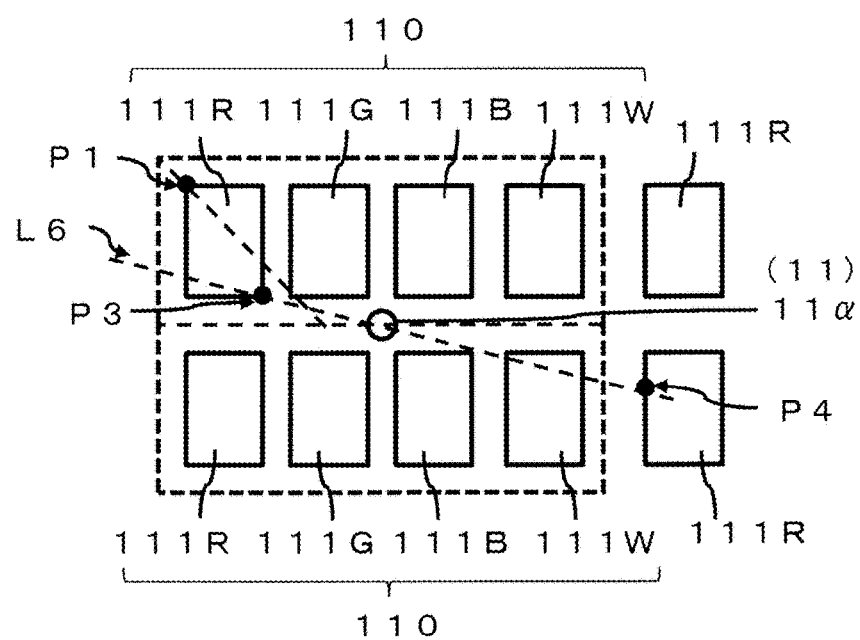

[ FIG. 13 ]
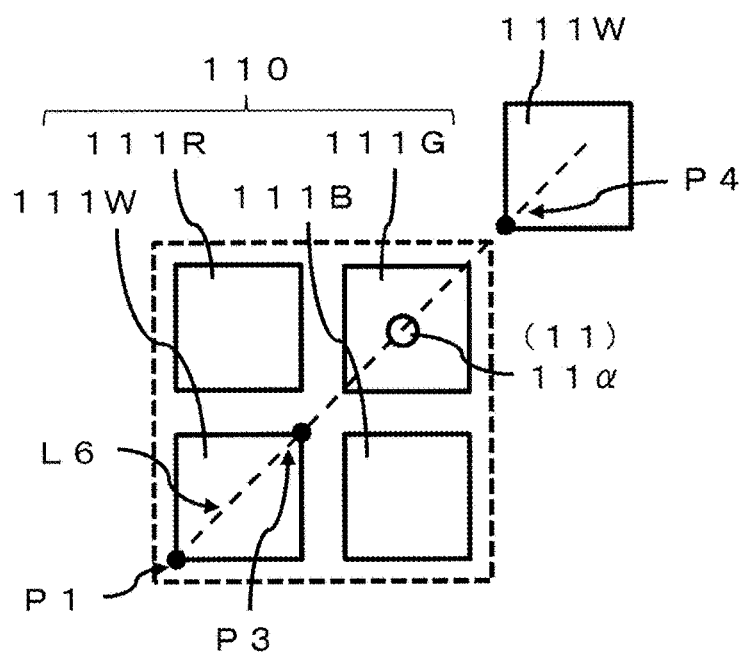

[ FIG. 14 ]
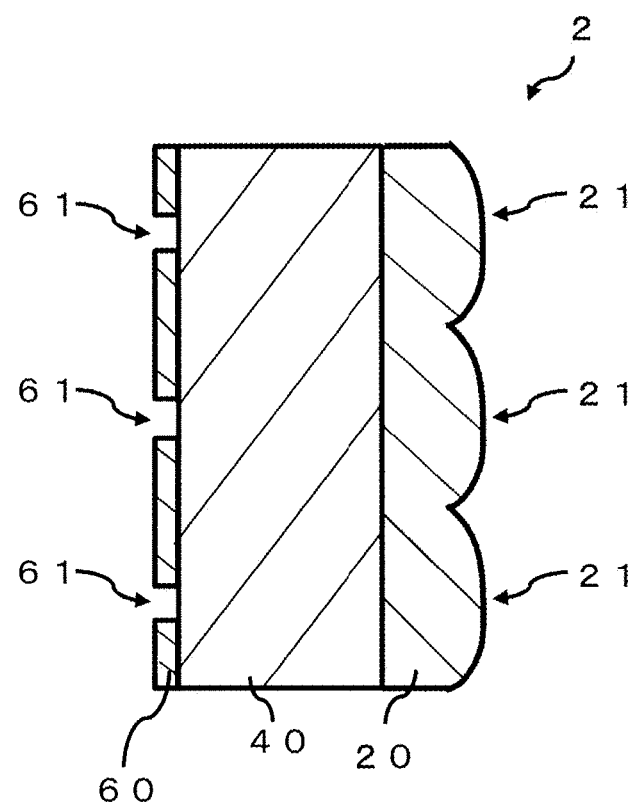

[ FIG. 15 ]
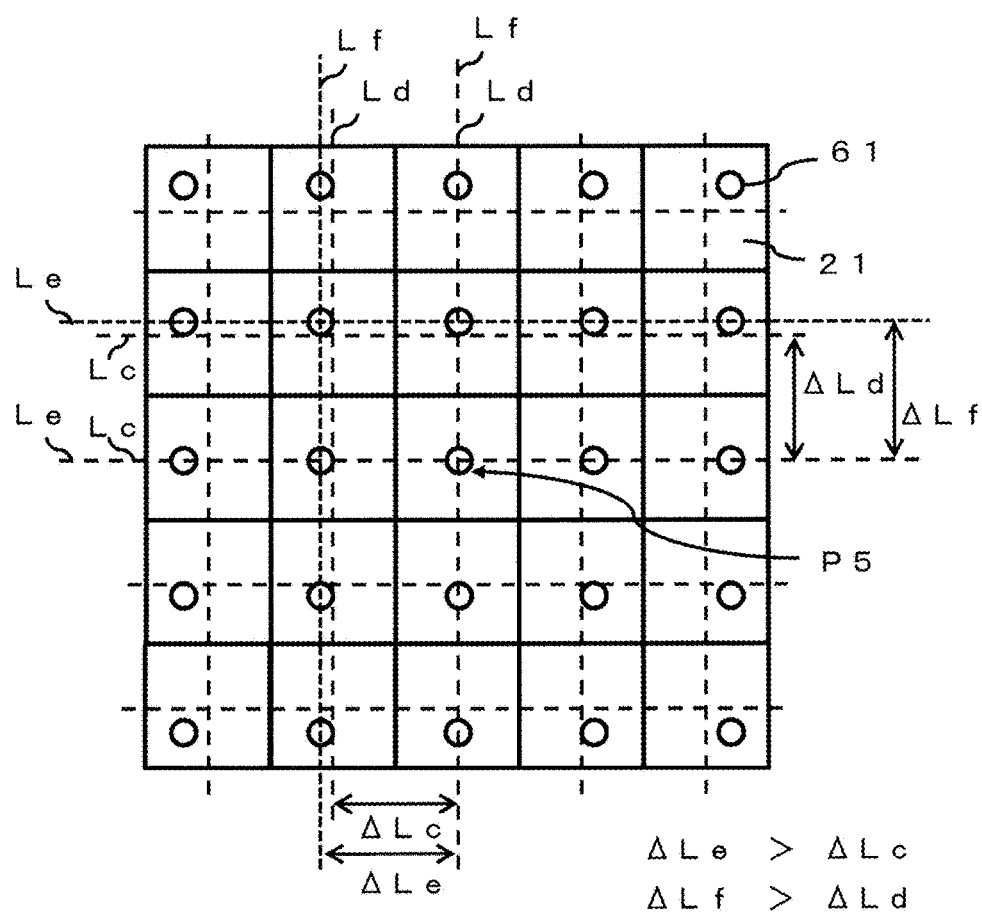

[FIG. 16]
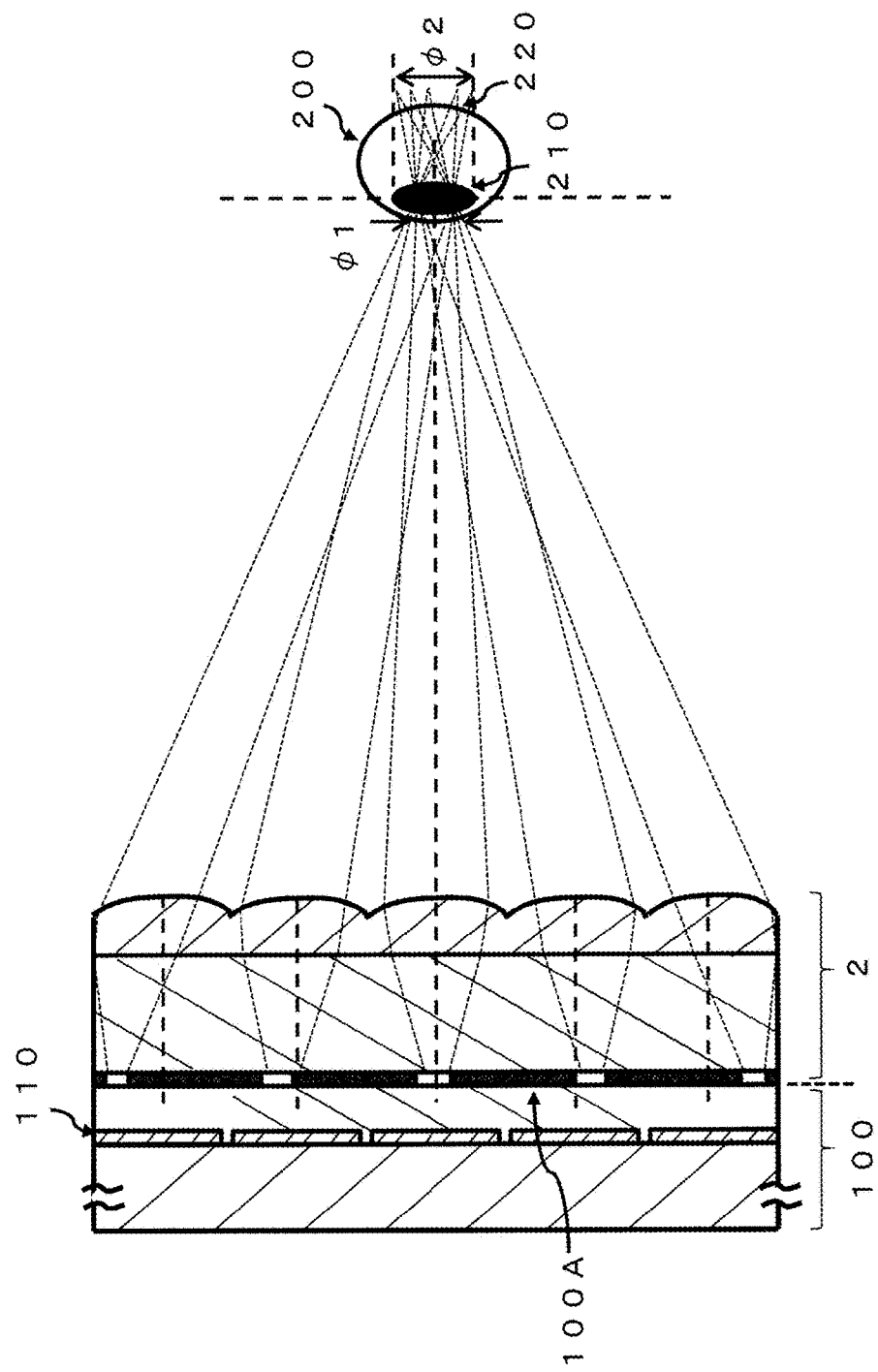

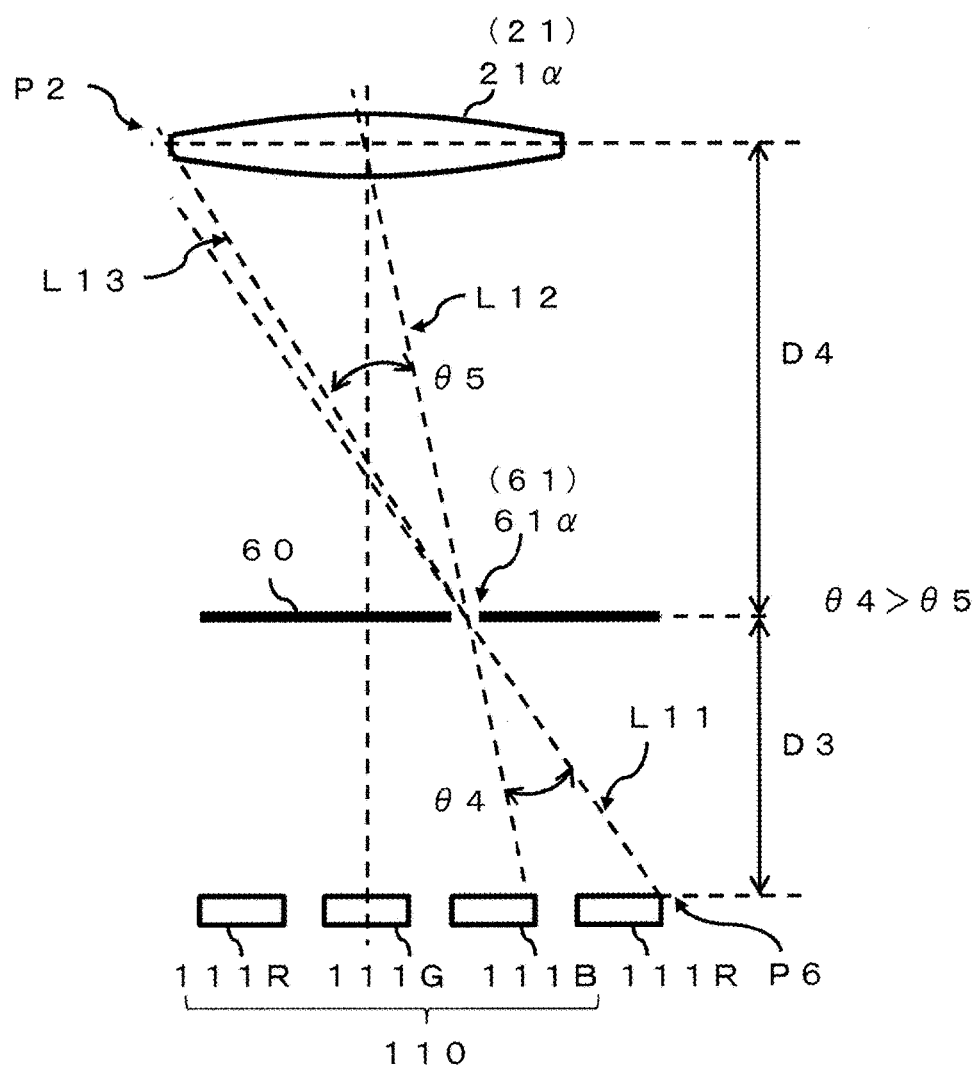
[FIG. 17]

[ FIG. 18 ]
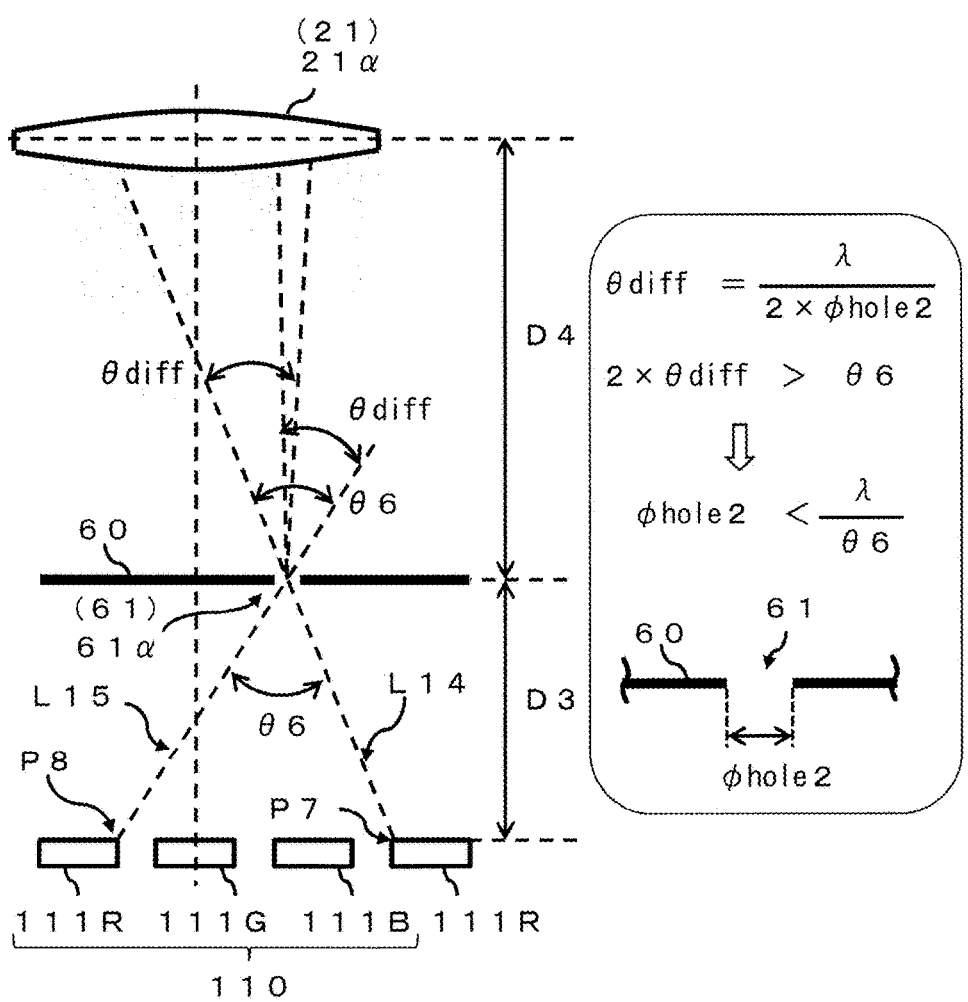

[ FIG. 19 ]
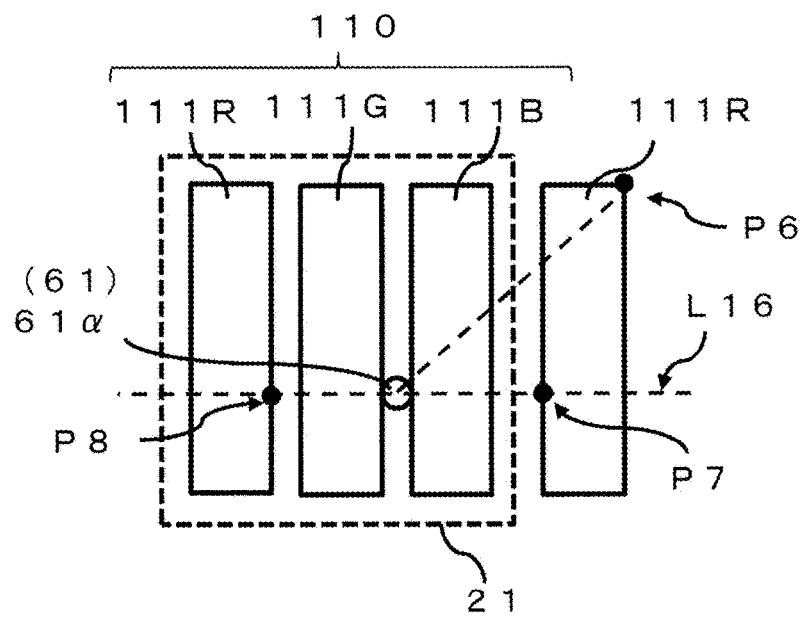
[ FIG. 20 ]
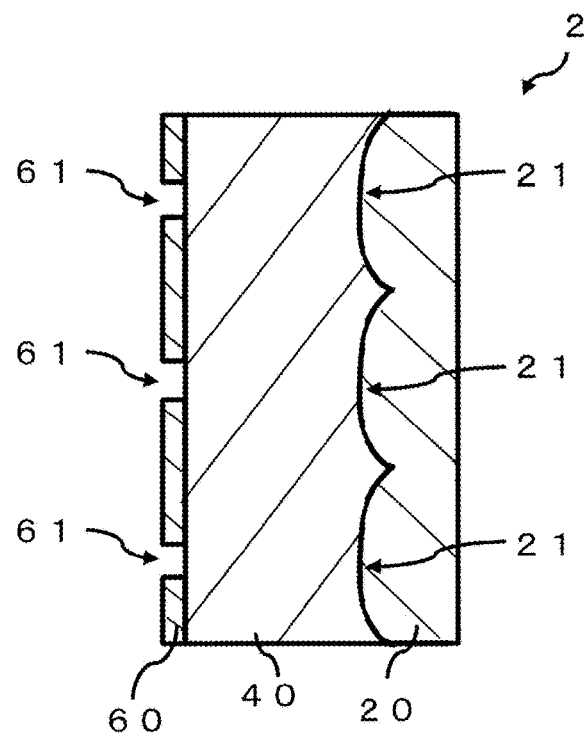

[FIG. 21]
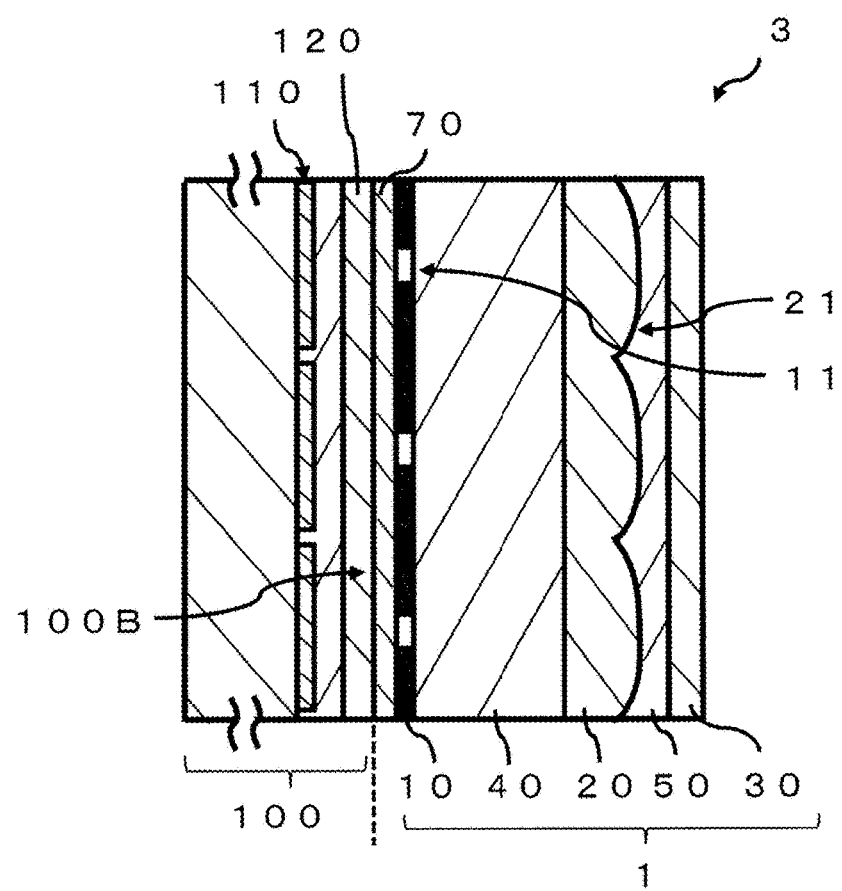

[FIG. 22]
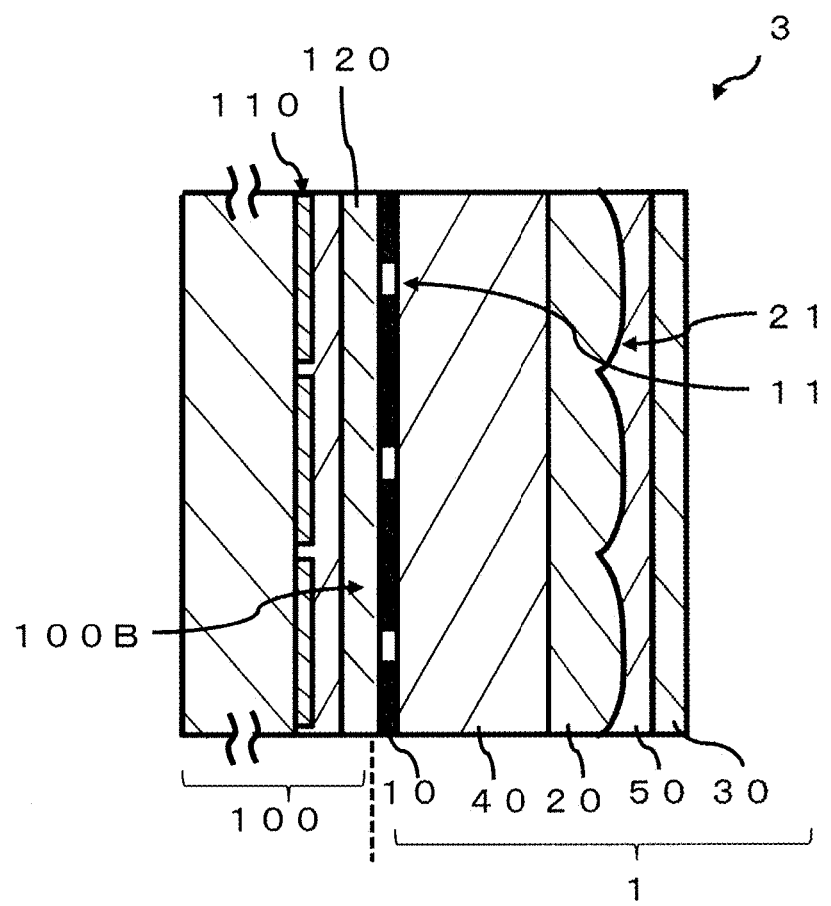

[ FIG. 23 ]
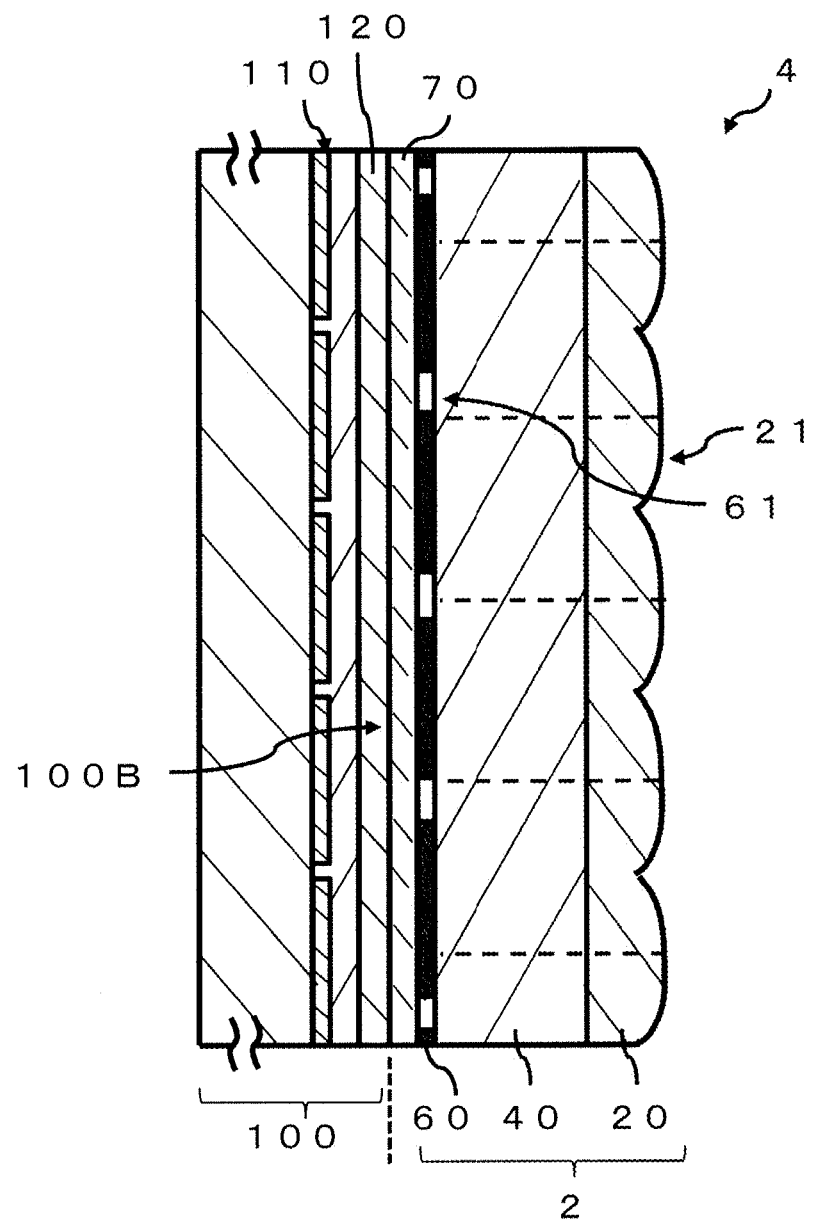

[ FIG. 24 ]
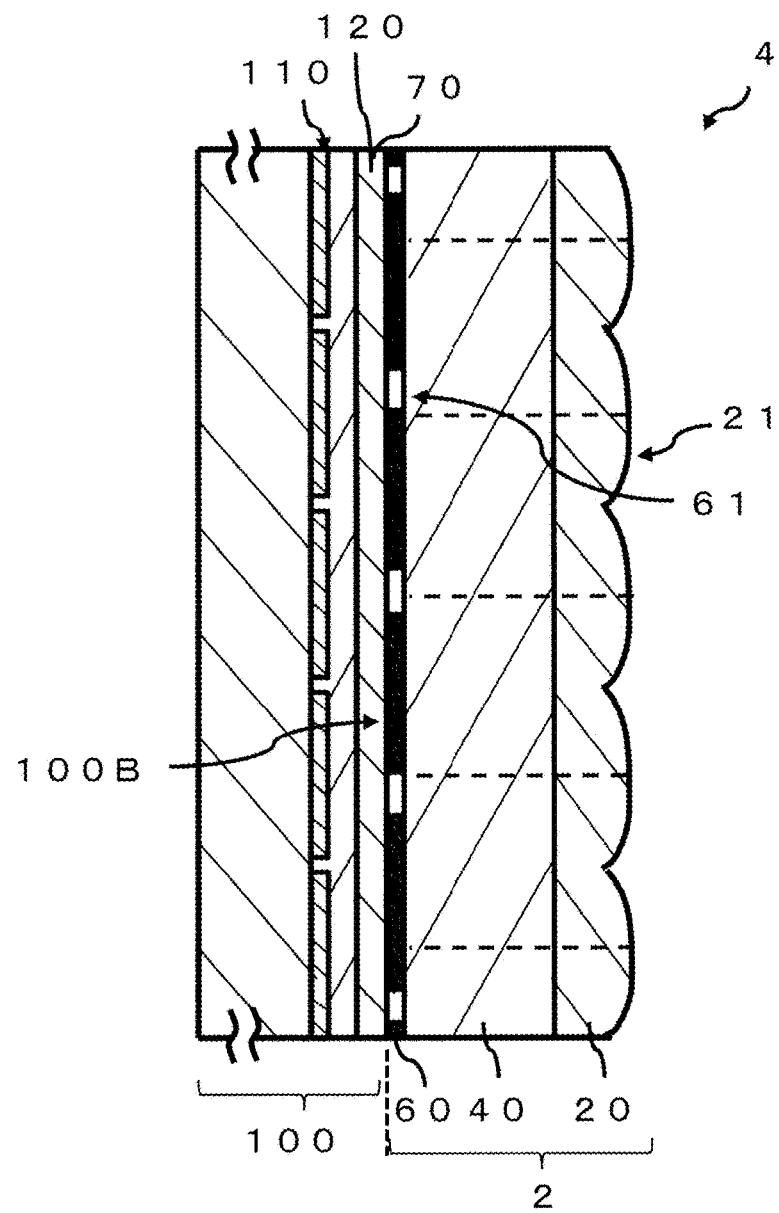

[FIG. 25]
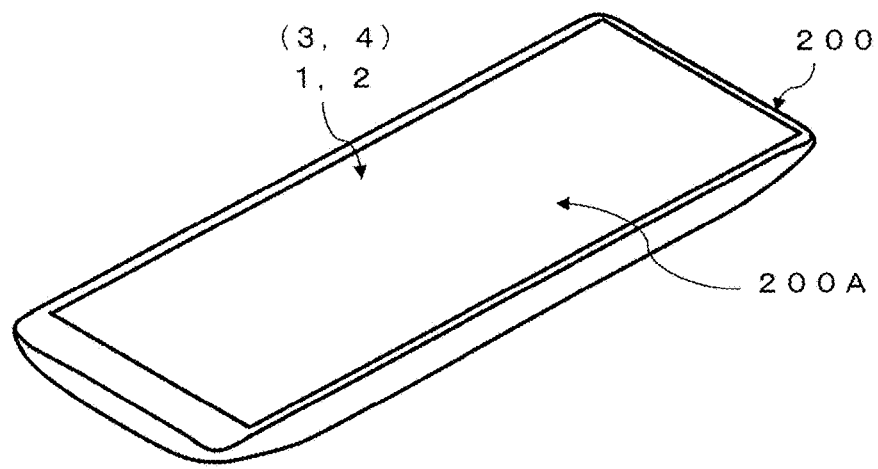
[FIG. 26]
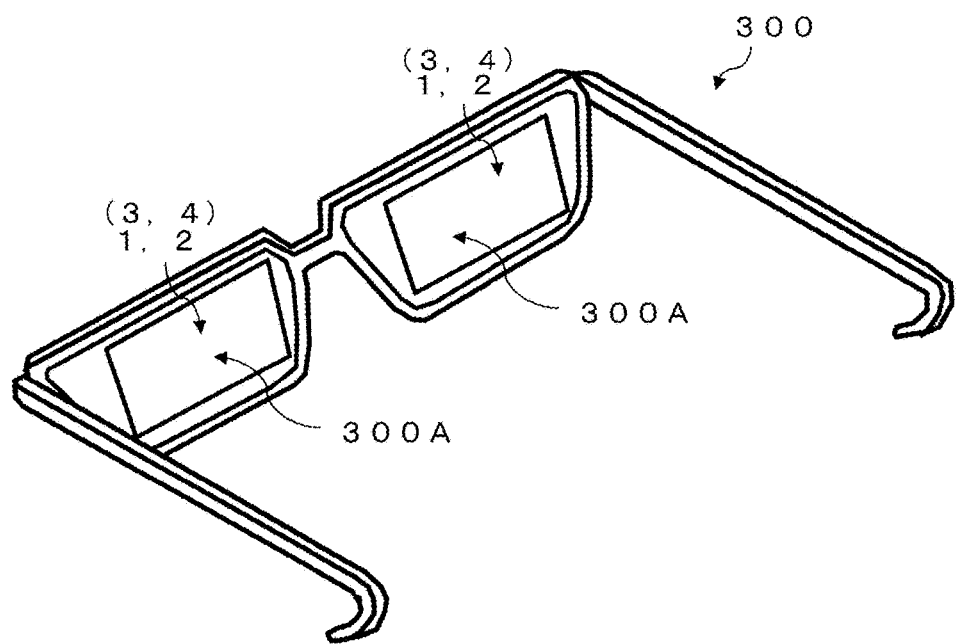

[ FIG. 27 ]
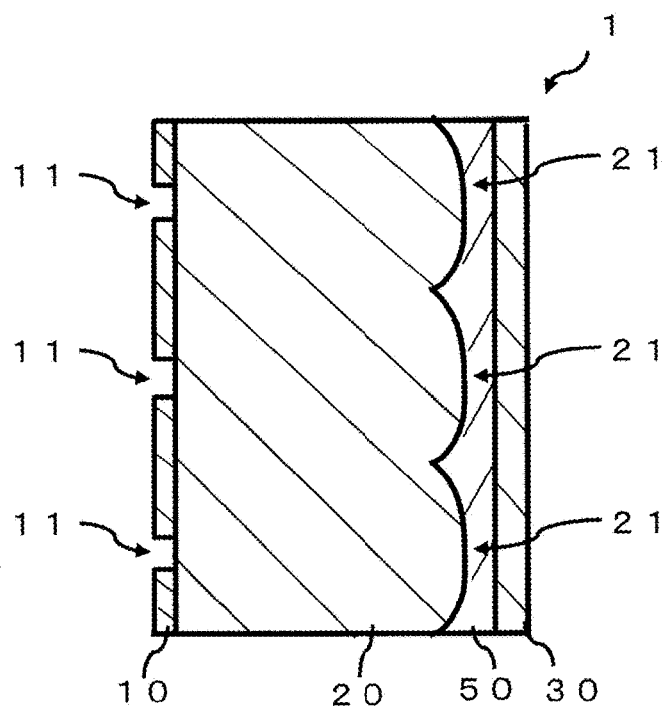
[ FIG. 28 ]
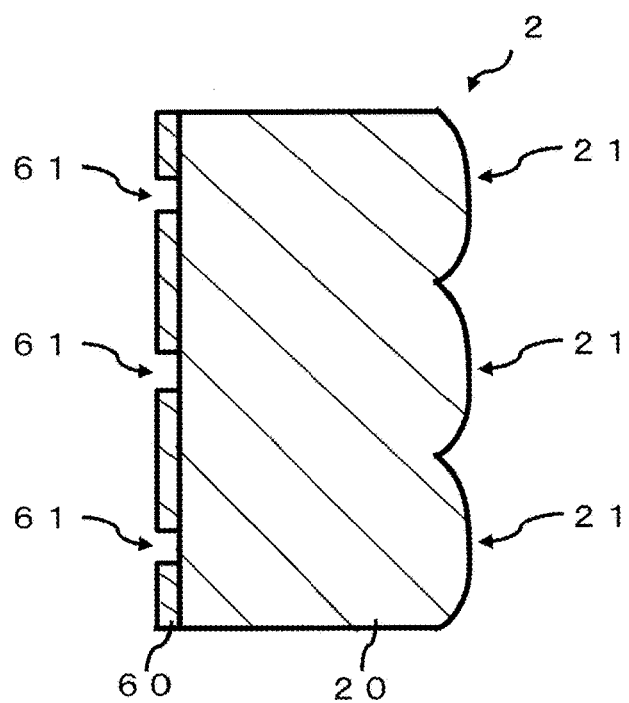

OPTICAL SHEET, DISPLAY DEVICE, AND ELECTRONIC APPARATUS

CROSS-REFERENCE TO RELATED APPLICATIONS

This application is a National Stage of International Application No. PCT/JP2015/085172, filed in the Japanese Patent Office as a Receiving office on Dec. 16, 2015, which claims priority to Japanese Patent Application Number 2015-029917, filed in the Japanese Patent Office on Feb. 18, 2015, each of which is hereby incorporated by reference in its entirety.

TECHNICAL FIELD

The present technology relates to an optical sheet and a display device including the same. The present technology further relates to an electronic apparatus including the foregoing display device.

BACKGROUND ART

In recent years, elderly presbyopic people have been increasing in association with aging of the population. Accordingly, a user-friendly display device for the elderly presbyopic people, that is, a display device that allows for easy focusing is desired. For example, in an invention disclosed in PTL 1, light of RGB having passed through respective apertures is projected and superimposed at a position of a pupil by a microlens so as to be smaller in diameter than the pupil. Images of the light of RGB that are superimposed at the position of the pupil are formed by a lens of an eye without being superimposed on an retina of the eye. This makes it possible to reduce image blurriness, as compared with existing display devices.

CITATION LIST

Patent Literature

PTL 1: Japanese Unexamined Patent Application Publication No. 2011-221046

SUMMARY OF THE INVENTION

However, in the invention disclosed in PTL 1, in order to allow the light of RGB having passed through the respective apertures to enter a common microlens, it is necessary to widen a clearance between the aperture and an information pixel that emits the light of RGB. This causes an issue that a thickness of a display unit is increased.

It is therefore desirable to provide an optical sheet having a thin thickness, and a display device and an electronic apparatus that each include the optical sheet.

A display device according to an embodiment of the present technology includes: a display panel including a plurality of display pixels that each include a plurality of sub-pixels; and an optical sheet provided at a position facing the plurality of display pixels. The optical sheet includes a pinhole mask including a plurality of pinholes that have a diffraction effect with respect to light emitted from the display pixels, and a microlens array including a plurality of microlenses. Herein, it is assumed that a member having a scattering or diffusion action is not provided in an optical path of light emitted from each of the sub-pixels. At this occasion, positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses.

An electronic apparatus according to an embodiment of the present technology includes the foregoing display device.

An optical sheet according to an embodiment of the present technology is an optical sheet suitable to be bonded to a display surface of a display panel, and the display panel includes a plurality of display pixels and the display surface. The plurality of display pixels each include a plurality of sub-pixels, and the display surface is provided at a position facing the plurality of display pixels. The optical sheet includes: a pinhole mask including a plurality of pinholes that have a diffraction effect with respect to light emitted from the display pixels; and a microlens array including a plurality of microlenses. Herein, it is assumed that a member having a scattering or diffusion action is not provided in an optical path of light emitted from each of the sub-pixels in a state in which the optical sheet is bonded to the display surface. At this occasion, positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses.

In the display device, the electronic apparatus, and the optical sheet according to the respective embodiments of the present technology, light emitted from each of the sub-pixels of all kinds enters the specific pinhole and is diffracted by the specific pinhole. This causes each thus-diffracted light outputted from the specific pinhole to enter the specific microlens. As described above, in the present technology, the diffraction effect by the pinholes is used; therefore, a part of the light emitted from the sub-pixels of all kinds is outputted from the specific pinhole at an exit angle smaller than an entry angle to enter the specific microlens. Accordingly, even in a case where a clearance between the pinhole mask and the display pixel is narrowed, it is possible to suppress a decline in color reproducibility.

According to the optical sheet of the embodiment of the present technology, a decline in color reproducibility is suppressed with use of the diffraction effect by the pinholes, which makes it possible to achieve an optical sheet having a thin thickness. In the display device and the electronic apparatus of the present technology, application of the optical sheet having a thin thickness makes it possible to reduce a thickness of the display device or the electronic apparatus. It is to be noted that effects of the present technology are not necessarily limited to the effects described here, and may include any of effects that are described herein.

BRIEF DESCRIPTION OF THE DRAWINGS

FIG. 1 is a diagram illustrating a cross-sectional configuration example of an optical sheet according to a first embodiment of the present technology.

FIG. 2A is a diagram illustrating a planar configuration example of a pinhole mask in FIG. 1.

FIG. 2B is a diagram illustrating a planar configuration example of a microlens array in FIG. 1.

FIG. 2C is a diagram illustrating a planar configuration example in a case where the pinhole mask in FIG. 2A and the microlens array in FIG. 2B are superimposed on each other.

FIG. 3 is a diagram illustrating a cross-sectional configuration example of the optical sheet in FIG. 1 and a display panel in a case where the optical sheet in FIG. 1 is bonded to the display panel.

FIG. 4A is a diagram illustrating a planar configuration example of a display pixel in FIG. 1.

FIG. 4B is a diagram illustrating a planar configuration example of the display pixel in FIG. 1.

FIG. 5 is a diagram illustrating an example of positions and sizes of a sub-pixel in FIG. 4A, a pinhole in FIG. 4A, and a microlens in FIG. 4A.

FIG. 6 is a diagram illustrating an example of positions and sizes of the sub-pixel in FIG. 4A, the pinhole in FIG. 4A, and the microlens in FIG. 4A.

FIG. 7 is a diagram illustrating a modification example of a cross-sectional configuration of the optical sheet in FIG. 1.

FIG. 8A is a diagram illustrating a planar configuration example of the pinhole mask in FIG. 1.

FIG. 8B is a diagram illustrating a planar configuration example of the microlens array in FIG. 1.

FIG. 8C is a diagram illustrating a planar configuration example in a case where the pinhole mask in FIG. 7A and the microlens array in FIG. 7B are superimposed on each other.

FIG. 9A is a diagram illustrating a planar configuration example of the pinhole mask in FIG. 1.

FIG. 9B is a diagram illustrating a planar configuration example of the microlens array in FIG. 1.

FIG. 9C is a diagram illustrating a planar configuration example in a case where the pinhole mask in FIG. 9A and the microlens array in FIG. 9B are superimposed on each other.

FIG. 10A is a diagram illustrating a planar configuration example of the pinhole mask in FIG. 1.

FIG. 10B is a diagram illustrating a planar configuration example of the microlens array in FIG. 1.

FIG. 10C is a diagram illustrating a planar configuration example in a case where the pinhole mask in FIG. 10A and the microlens array in FIG. 10B are superimposed on each other.

FIG. 11 is a diagram illustrating a planar configuration example of the display pixel in FIG. 1.

FIG. 12 is a diagram illustrating a planar configuration example of the display pixel in FIG. 1.

FIG. 13 is a diagram illustrating a planar configuration example of the display pixel in FIG. 1.

FIG. 14 is a diagram illustrating a cross-sectional configuration example of an optical sheet according to a second embodiment of the present technology.

FIG. 15 is a diagram illustrating a planar configuration example in a case where the pinhole mask in FIG. 14 and the microlens array in FIG. 14 are superimposed on each other.

FIG. 16 is a diagram illustrating a cross-sectional configuration example of the optical sheet in FIG. 14 and a display panel in a case where the optical sheet in FIG. 14 is bonded to the display panel.

FIG. 17 is a diagram illustrating an example of positions and sizes of a sub-pixel in FIG. 16, a pinhole in FIG. 16, and a microlens in FIG. 16.

FIG. 18 is a diagram illustrating an example of positions and sizes of the sub-pixel in FIG. 16, the pinhole in FIG. 16, and the microlens in FIG. 16.

FIG. 19 is a diagram illustrating a planar configuration example of a display pixel in FIG. 16.

FIG. 20 is a diagram illustrating a modification example of a cross-sectional configuration of the optical sheet in FIG. 14.

FIG. 21 is a diagram illustrating a cross-sectional configuration example of a display device according to a third embodiment of the present technology.

FIG. 22 is a diagram illustrating a cross-sectional configuration of the display device in FIG. 21.

FIG. 23 is a diagram illustrating a cross-sectional configuration example of a display device according to a fourth embodiment of the present technology.

FIG. 24 is a diagram illustrating a modification example of a cross-sectional configuration of the display device in FIG. 23.

FIG. 25 is a diagram perspectively illustrating an example of a state in which the optical sheet in FIG. 1 is bonded to a display surface of an electronic apparatus.

FIG. 26 is a diagram perspectively illustrating an example of a state in which the optical sheet in FIG. 1 is bonded to a display surface of an electronic apparatus.

FIG. 27 is a diagram illustrating a modification example of a cross-sectional configuration of the optical sheet in FIG. 1.

FIG. 28 is a diagram illustrating a modification example of a cross-sectional configuration of the optical sheet in FIG. 14.

MODES FOR CARRYING OUT THE INVENTION

In the following, some embodiments of the present technology are described in detail with reference to drawings. The embodiments described below each illustrate a specific example of the present technology, and the present technology is not limited to the following embodiments. Moreover, the present technology is not limited to positions, dimensions, dimension ratios, and other factors of respective components illustrated in the drawings. It is to be noted that description is given in the following order.

1. First Embodiment (Optical Sheet)
2. Modification Examples of First Embodiment (Optical Sheet)
3. Second Embodiment (Optical Sheet)
4. Modification Examples of First Embodiment (Optical Sheet)
5. Third Embodiment (Display Device)
6. Fourth Embodiment (Display Device)
7. Fifth Embodiment (Electronic Apparatus)
8. Sixth Embodiment (Electronic Apparatus)
9. Common Modification Examples (Optical Sheet, Display Device, and Electronic Apparatus)

1. First Embodiment

[Configuration]

Description is given of a configuration of an optical sheet 1 according to a first embodiment of the present technology. The optical sheet 1 corresponds to a specific example of an "optical sheet" of the present technology. FIG. 1 illustrates a schematic configuration of the optical sheet 1 according to the first embodiment of the present technology. The optical sheet 1 is suitably bonded to, for example, a display surface 200A of an electronic apparatus 200 to be described later (refer to FIG. 23) or a display surface 300A of an electronic apparatus 300 (refer to FIG. 24). The optical sheet 1 has, for example, a planar shape similar to a planar shape of the display surface 200A or the display surface 300A. In a case where the display surface 200A or the display surface 300A has a rectangular shape, the planar shape of the optical sheet 1 is a rectangular shape. At this occasion, the optical sheet 1 is bonded onto the display surface 200A or the display surface 300A so that one side of the optical sheet 1 is parallel or substantially parallel to one side of the display surface 200A or the display surface 300A.

The optical sheet 1 includes, for example, a pinhole mask 10, a microlens array 20, and a lens sheet 30 as illustrated in FIG. 1. The pinhole mask 10 corresponds to a specific example of a "pinhole mask" of the present technology. The microlens array 20 corresponds to a specific example of a "microlens array" of the present technology. The lens sheet 30 corresponds to a specific example of a "lens sheet" of the present technology. The pinhole mask 10, the microlens array 20, and the lens sheet 30 are disposed in order of the pinhole mask 10, the microlens array 20, and the lens sheet 30 from a bonding surface (for example, the display surface 200A or the display surface 300A). In other words, a surface of the pinhole mask 10 serves as a light entry surface of the optical sheet 1, and a surface of the lens sheet 30 serves as a light exit surface of the optical sheet 1.

It is to be noted that an adhesive layer, a pressure-sensitive adhesive layer, or an electrically-charged layer may be provided on the surface (the light entry surface) of the pinhole mask 10. Moreover, a protective film that protects the lens sheet 30 may be provided on the surface (the light exit surface) of the lens sheet 30. The optical sheet 1 further includes, for example, a spacer 40 between the pinhole mask 10 and the microlens array 20, and a spacer 50 between the microlens array 20 and the lens sheet 30. In the following, description is given of the spacers 40 and 50, the pinhole mask 10, the microlens array 20, and the lens sheet 30 in this order.

(Spacers 40 and 50)

The spacer 40 is provided to secure a clearance between the microlens array 20 and the pinhole mask 10, and is configured of, for example, a light-transmissive resin layer. In the spacer 40, a light entry surface (a surface on the pinhole mask 10 side) and a light exit surface (a surface on the microlens array 20 side) are both flat surfaces. The spacer 50 is provided to secure a clearance between the lens sheet 30 and the microlens array 20, and is configured of, for example, a light-transmissive resin layer. In the spacer 50, a light entry surface (a surface on the microlens array 20 side) has a surface shape following a surface shape of the microlens array 20. In the spacer 50, a light exit surface (a surface on the lens sheet 30 side) is a flat surface. In the present embodiment, unlike a scattering plate and a diffusion plate, the spacer 40 does not have a function of actively scattering or diffusing light. In other words, the optical sheet 1 is optically designed not to cause any difficulty even if the spacer 40 does not serve as a scattering plate or a diffusion plate. The spacers 40 and 50 each may be an air layer. It is to be noted that optical design of the optical sheet 1 is described in detail later.

(Pinhole Mask 10)

The pinhole mask 10 includes a plurality of pinholes 11 that each have a diffraction effect with respect to light emitted from a display pixel 110 to be described later. The pinholes 11 correspond to a specific example of "pinholes" of the present technology. The pinholes 11 each have a diameter having the diffraction effect with respect to light (visible light) emitted from the display pixel 110, and has, for example, a diameter of 7.5 μm. The pinholes 11 are provided in a sheet-like light-blocking member. Accordingly, the pinhole mask 10 allows light emitted from the display pixel 110 to pass therethrough via the respective pinholes 11. The pinhole mask 10 is formed, for example, by coating the light entry surface of the spacer 40 with a light-blocking material including, for example, black carbon and thereafter forming a plurality of apertures in the light-blocking material with which the light entry surface is coated. The pinhole mask 10 may be formed, for example, by forming a thin film of chromium on the light entry surface of the spacer 40 and thereafter etching the thin film of chromium to form apertures.

FIG. 2A illustrates a planar configuration example of the pinhole mask 10. The plurality of pinholes 11 are disposed in a grid pattern. The plurality of pinholes 11 are disposed side by side in a direction parallel to a line segment La and are disposed side by side in a direction parallel to a line segment Lb orthogonal or substantially orthogonal to the line segment La. The plurality of pinholes 11 are disposed side by side in the direction parallel to the line segment La with an array pitch ΔLa. The array pitch ΔLa is, for example, 100 μm. The plurality of pinholes 11 are disposed side by side in the direction parallel to the line segment Lb with an array pitch ΔLb. The array pitch ΔLb is, for example, 100 μm. For example, the array pitch ΔLa and the array pitch ΔLb are equal to each other. It is to be noted that the array pitch ΔLa and the array pitch ΔLb may be different from each other.

The plurality of pinholes 11 are disposed side by side in a direction within a range of ±1.0° of a direction parallel to a line segment Lc, and are disposed side by side in a direction within a range of ±1.0° of a direction parallel to a line segment Ld. The line segment Lc corresponds to a specific example of a "first direction" of the present technology. The line segment Ld corresponds to a specific example of a "second direction" of the present technology. Herein, the direction parallel to the line segment La corresponds to the direction within the range of ±1.0° of the direction parallel to the line segment Lc. The direction parallel to the line segment Lb corresponds to the direction within the range of ±1.0° of the direction parallel to the line segment Ld.

(Microlens Array 20)

The microlens array 20 includes a plurality of microlenses 21. The microlenses 21 is adapted to concentrate light having passed through the pinholes 11, and has, for example, a convex shape projected toward light exit side. FIG. 2B illustrates a planar configuration example of the microlens array 20. The plurality of microlenses 21 are disposed in a grid pattern. The plurality of microlenses 21 are disposed side by side in the direction parallel to the line segment Lc, and are disposed side by side in the direction parallel to the line segment Ld intersecting (for example, orthogonal to) the line segment Lc. The plurality of microlenses 21 are disposed side by side in the direction parallel to the line segment Lc with an array pitch ΔLc. The array pitch ΔLC is, for example, 100 μm. The plurality of microlenses 21 are disposed side by side in the direction parallel to the line segment Ld with an array pitch ΔLd. The array pitch ΔLd is, for example, 100 μm. For example, the array pitch ΔLc and the array pitch ΔLd are equal to each other. It is to be noted that the array pitch ΔLc and the array pitch ΔLd may be different from each other.

FIG. 2C illustrates a planar configuration example in a case where the pinhole mask 10 and the microlens array 20 are superimposed on each other. One of the plurality of microlenses 21 is assigned to each of the pinholes 11. The array pitch ΔLa of the plurality of pinholes 11 is equal to the array pitch ΔLc of the plurality of microlenses 21. The array pitch ΔLb of the plurality of pinholes 11 is equal to the array pitch ΔLd of the plurality of microlenses 21. Accordingly, the microlenses 21 and the pinholes 11 are disposed to face each other. In a plan view of the pinhole mask 10 and the microlens array 20, a center of each of the pinholes 11 is preferably superimposed on a center of relevant one of the microlenses 21. It is to be noted that in the plan view of the pinhole mask 10 and the microlens array 20, the center of each of the pinholes 11 may be shifted from the center of relevant one of the microlenses 21 by predetermined magnitude toward a specific direction.

(Relationship Between Optical Sheet 1 and Display Panel 100)

FIG. 3 illustrates a cross-sectional configuration example of the optical sheet 1 and a display panel 100 in a case where the optical sheet 1 is bonded to a display surface 100A of the display panel 100. FIGS. 4A and 4B each illustrate a planar configuration example of the display pixel 110. The display panel 100 is provided, for example, at a position of the display surface 200A or the display surface 300A. The display panel 100 includes a plurality of display pixels 110 disposed in a grid pattern and the display surface 100A provided at a position facing the plurality of display pixels 110. The display surface 100A corresponds to the display surface 200A or the display surface 300A. The display panel 100 displays, for example, an image on a basis of an image signal. The display panel 100 emits, for example, image light corresponding to the image signal from the respective display pixels 110.

Each of the display pixels 110 includes sub-pixels 111 of a plurality of kinds that emits light of colors different from one another. In each of the display pixels 110, the sub-pixels 111 of the plurality of kinds are configured of, for example, a sub-pixel 111R that emits red light, a sub-pixel 111G that emits green light, and a sub-pixel 111B that emits blue light. Each of the sub-pixels 111 includes, for example, a self-luminous element that generates light itself. It is to be noted that each of the sub-pixels 111 may include, for example, an element that modulates incoming light.

The sub-pixels 111R, 111G, and 111B each have, for example, a rectangular shape as illustrated in FIGS. 4A and 4B, and each have, for example, a 80 μm (a length in the direction parallel to the line segment Ld)×27 μm (a length in the direction parallel to the line segment Lc) rectangular shape. The sub-pixels 111R, 111G, and 111B are disposed side by side in order of the sub-pixel 111R, the sub-pixel 111G, and the sub-pixel 111B in a direction where a short side of the sub-pixel 111R extends, as illustrated in FIGS. 4A and 4B. At this occasion, the plurality of display pixels 110 are disposed side by side in the direction parallel to the line segment Lc with a pitch (for example, 100 μm) equal to the array pitch ΔLc. Moreover, the plurality of display pixels 110 are disposed side by side in the direction parallel to the line segment Ld with a pitch (for example, 100 μm) equal to the array pitch ΔLd.

In a plan view of the display panel 100, the pinhole mask 10, and the microlens array 20, for example, the center of each of the pinholes 11 and the center of each of the microlenses 21 is superimposed on a center of relevant one of the display pixels 110, as illustrated in FIG. 4A. In the plan view of the display panel 100, the pinhole mask 10, and the microlens array 20, for example, the center of the each of the pinholes 11 and the center of each of the microlenses 21 may be shifted from the center of relevant one of the display pixels 110 by predetermined magnitude toward a specific direction. In other words, in a case where the optical sheet 1 is bonded to the display surface 100A, a coordinate position of the optical sheet 1 in the display surface 100A is not particularly limited.

Next, description is given of positions and sizes of the sub-pixels 111, the pinhole 11, and the microlens 21 with reference to FIGS. 3, 4A, 4B, 5, and 5. FIGS. 5 and 6 each illustrate an example of positions and sizes of the sub-pixels 111, the pinhole 11, and the microlens 21. Herein, it is assumed that in a case where the optical sheet 1 is bonded to the display surface 100A, a member having a scattering or diffusion action is not provided in an optical path of light emitted from each of the sub-pixels 111. At this occasion, the positions and sizes of the plurality of pinholes 11 and the plurality of microlenses 21 allow light emitted from each of the sub-pixels 111 of all kinds to enter a specific pinhole 11α serving as one common pinhole 11 and be diffracted by the specific pinhole 11α, thereby allowing each thus-diffracted light outputted from the specific pinhole 11α to enter a specific microlens 21α that is one of the microlenses 21.

More specifically, the positions and sizes of the plurality of pinholes 11 and the plurality of microlenses 21 satisfy the following expression (1).

$$\theta 1 > \theta 2 \tag{1}$$

where θ1 is an angle between a first line segment L1 passing through a center of the specific pinhole 11α and a point P1 and a second line segment L2 passing through the center of the specific pinhole 11α and a center of the specific microlens 21α, θ2 is an angle between a third line segment L3 passing through the center of the specific pinhole 11α and a point P2 and the second line segment L2, P1 is a point farthest from the specific pinhole 11α of the sub-pixel 111 (a first sub-pixel) farthest from the center of the specific pinhole 11α in the sub-pixels 111 of all kinds closest to the specific pinhole 11α, and P2 is an end of the specific microlens 21α.

At this occasion, for example, the point P1 is located at an upper left corner of the sub-pixel 111R, as illustrated in FIGS. 4A, 4B, and 5. The expression (1) indicates that, assuming that the pinholes 11 do not have a diffraction effect, a part of light having entered the specific pinhole 11α of the light emitted from the sub-pixel 111 (the first sub-pixel) enters the specific microlens 21α. In other words, the expression (1) is premised on D1<D2. A distance D2 is, for example, magnitude within a range of ±10% of a focal length of the microlens 21. Herein, in a case where the diameter of the microlens 21 is 100 μm and D2 is 1500 μm, θ2 is 2.70°. Moreover, in a case where, in FIG. 4A, a distance between the point P1 and the pinhole 11 on a plane is 71 μm and D1 is 1000 μm, θ1 is 4.04° (>θ2).

D1 is a distance between the center of the specific pinhole 11a and the display pixel 110, and D2 is a distance between the center of the specific microlens 21α and the center of the specific pinhole 11α.

The "sub-pixels 111 of all kinds closest to the specific pinhole 11α" correspond to, for example, the sub-pixels 111 of all kinds included in the display pixel 111 (a specific display pixel) facing the specific pinhole 11α, as illustrated in FIG. 5. It is to be noted that in a case where the center of each of the pinholes 11 is shifted from the center of relevant one of the display pixels 110 by predetermined magnitude toward the specific direction, the sub-pixels 111 of some kinds in the "sub-pixels 111 of all kinds closest to the specific pinhole 11α" may be the sub-pixels 111 included in the display pixel adjacent to the specific display pixel.

Moreover, a diameter $\phi_{hole1}$ of the specific pinhole 11α satisfies the following expression (2). The expression (2) indicates that light having entered the specific pinhole 11α from the specific display pixel and light having entered the specific pinhole 11α from the display pixel 110 adjacent to the specific display pixel are diffracted by a diffraction angle $\theta_{diff}$ to enter the specific microlens 21α, which causes light of a same color to be applied to the entire specific microlens 21α. In other words, the expression (2) is an expression to achieve high color reproducibility and less color unevenness.

$$\phi_{hole1} < \lambda/\theta3 \quad (2)$$

where λ is a central wavelength of light emitted from the sub-pixel 111,

θ3 is an angle between a fourth line segment L4 passing through the center of the specific pinhole 11α and a point P3 and a fifth line segment L5 passing through the center of the specific pinhole 11α and a point P4, P3 is a point closest to the specific pinhole 11α of the sub-pixel 111 (the first sub-pixel), and P4 is a point intersecting a sixth line segment L6 (refer to FIG. 6) and closest to the specific pinhole 11α of the sub-pixel 111 (a second sub-pixel), where the sub-pixel 111 (the second sub-pixel) is closest to the center of the specific pinhole 11α in a plurality of sub-pixels 111 of the same kind as a kind of the sub-pixel 111 (the first sub-pixel) adjacent to the sub-pixel 111 (the first sub-pixel) in a plan view of the sub-pixel 111 (the second sub-pixel), and the sixth line segment L6 passes through a point facing the center of the specific pinhole 11a and the point P3.

The expression (2) is obtained by the following expressions (3) and (4).

$$\theta_{diff} = \lambda/(2 \times \phi_{hole1}) \quad (3)$$

$$2 \times \theta_{diff} > \theta3 \quad (4)$$

The point P3 is located in, for example, a central portion of a right edge of the sub-pixel 11R included in the display pixel 110 facing the specific pinhole 11α, as illustrated in FIG. 4A. Moreover, the point P3 is located in, for example, a lower portion of the right edge of the sub-pixel 11R included in the display pixel 110 facing the specific pinhole 11α, as illustrated in FIG. 4B. The point P4 is located in, for example, a central portion of a left edge of the sub-pixel 111R included in the display pixel 110 adjacent to the display pixel 110 facing the specific pinhole 11α, as illustrated in FIG. 4A. Moreover, the point P4 is located, for example, in a lower portion of the left edge of the sub-pixel 111R included in the display pixel 110 adjacent to the display pixel 110 facing the specific pinhole 11α, as illustrated in FIG. 4B. Herein, in a case where λ is 0.55 μm and the diameter $\phi_{hole1}$ of the pinhole 11 is 7.5 μm, $\theta_{diff}$ is 2.56°. Moreover, in a case where a distance between P3 and P4 is 66.7 μm and D1 is 1000 μm in FIG. 4A, θ3 is 3.82°. Accordingly, $2 \times \theta_{diff}/\theta3 = 1.34$ (>1) is established.

The foregoing expressions (1) to (4) are represented by the diffraction effect by the pinhole 11 and geometric configurations of the sub-pixels 111, the pinholes 11, and the microlenses 21. The foregoing expressions (1) to (4) suggest that even though the member having a scattering or diffusion action is not provided between the display pixel 110 and the pinhole mask 10, high color reproducibility and less color unevenness are achievable. In other words, in a case where the positions and sizes of the plurality of pinholes 11 and the plurality of microlenses 21 satisfy the expression (1), and the diameter $\phi_{hole1}$ of the specific pinhole 11α satisfies the expression (2), it is not necessary to provide a scattering plate or a diffusion plate in order to improve color reproducibility and reduce color unevenness. The scattering plate or the diffusion plate may be provided between the display pixel 110 and the pinhole mask 10; however, in such a case, the scattering plate or the diffusion plate may rather cause a concern that contrast or light transmittance declines.

As can be seen from the expression (2), light of a same color emitted from the specific display pixel and the display pixel 110 adjacent to the specific display pixel is applied to the entire specific microlens 21α. In a case where both the center of each of the pinholes 11 and the center of each of the microlenses 21 are superimposed on the center of relevant one of the display pixels 110, an area illuminated with the light emitted from the specific display pixel of the specific microlens 21α is wider than an area illuminated with light emitted from the display pixel 110 adjacent to the specific display pixel of the specific microlens 21α. In contrast, in a case where both the center of each of the pinholes 11 and the center of each of the microlenses 21 are shifted from the center of relevant one of the display pixels 110 by the predetermined magnitude toward the specific direction, the area illuminated with the light emitted from the display pixel 110 adjacent to the specific display pixel of the specific microlens 21α may be wider than the area illuminated with the light emitted from the specific display pixel of the specific microlens 21α in some cases. Accordingly, a ratio of both the respective areas illuminated with the light varies depending on the central positions of each of the pinholes 11 and each of the microlenses 21; however, independent of the ratio of both the respective areas illuminated with the light, light of a same color is applied to the entire specific microlens 21α. This shows that in a case where the optical sheet 1 is bonded to the display surface 100A, the coordinate position of the optical sheet 1 in the display surface 100A is not particularly limited.

(Lens Sheet 30)

The lens sheet 30 superimposes light having passed through the respective microlenses 21 on one another. The lens sheet 30 is, for example, a convex lens or a field lens. In a case where the lens sheet 30 is the convex lens, the lens sheet 30 has a function of concentrating light having passed through each of the microlenses 21. The lens sheet 30 may be, for example, a Fresnel lens having a function of a convex lens, as illustrated in FIG. 7. Herein, for example, the pinhole mask 10, the microlens array 20, and the lens sheet 30 are configured to superimpose light diffracted by the respective pinholes 11 on one another so that a diameter $\phi1$ of the light at a predetermined position is smaller (for example, in a range from 0.1 mm to 3 mm both inclusive) than a diameter $\phi2$ of a pupil of an eye 210. The "predetermined position" is specifically a pupil position of the eye 210. For example, the "predetermined position" is specifically a pupil position of the eye 210. For example, in a case where D2 is equal to 1500 μm and a distance between the microlens 21 and the pupil of the eye 210 is equal to 200 mm, the diameter $\phi1$ of a light beam having passed through each of the pinholes 11 at the pupil position of the eye 210 is 1 mm.

In the following, description is given of a significance of the diameter $\phi1$ being smaller than the diameter $\phi2$.

In presbyopia, refractive power of the eye 210 is weak, which does not allow for focusing on a retina 220. Accordingly, for example, in a case where the optical sheet 1 is not provided on the display surface 100A of the display panel 100, light fluxes (incoming light fluxes) that are emitted from the respective display pixels 100 and enter the entire eye 210 form a large image on the retina 220. This does not allow a viewer to see an in-focus image. Moreover, some of the foregoing incoming light fluxes are superimposed on one another on the retina 220. This does not allow the viewer to recognize the foregoing respective incoming light fluxes separately from one another, which causes the viewer to see a blurred image.

In contrast, in a case where the diameter φ1 is smaller than the diameter φ2, for example, light diffracted by the respective pinholes 11 forms a small image on the retina 220, as illustrated in FIG. 3. Accordingly, the viewer is allowed to see an image that is more in focus, as compared with the foregoing case. Moreover, light diffracted by the respective pinholes 11 are not superimposed on the retina 220, and forms images at different positions on the retina 220. This makes it possible for the viewer to separately recognize the light diffracted by the respective pinholes 11. Accordingly, it is possible for the viewer to see a clearer image, as compared with the foregoing case.

Herein, the diameter φ2 of the pupil of the eye 210 of an adult under a normal bright condition is slightly larger than 3 mm. Therefore, in order to separate light diffracted by the respective pinholes 11 from one another on the retina 220, the diameter φ1 at the pupil position of the eye 210 is preferably equal to or smaller than 3 mm. However, if the light diffracted by the respective pinholes 11 is concentrated too much, angular resolution of the retina 220 is deteriorated. In a case where the angular resolution of the retina 220 is an acceptable minimum value, the diameter φ1 at the pupil position of the eye 210 is 0.1 mm. Accordingly, the microlens array 20 and the lens sheet 30 are preferably configured to superimpose the light diffracted by the respective pinholes 11 on one another so that the diameter φ1 at the pupil position of the eye 210 falls within a range from 0.1 mm to 3 mm both inclusive.

[Workings]

Next, description is given of workings of the optical sheet 1 according to the present embodiment. Inputting an image signal from outside to the display panel 100 causes each of the display pixels 110 to emit light corresponding to the image signal. More specifically, the sub-pixel 111R emits red light, the sub-pixel 111G emits green light, and the sub-pixel 111B emits blue light. Light emitted from each of the sub-pixels 111 is diffracted by the pinhole 11 to enter the microlenses 21. More specifically, light emitted from each of the sub-pixels 111 of the specific display pixel and light emitted from the display pixel 110 adjacent to the specific display pixel are diffracted by the specific pinhole 11α to enter the specific microlens 21α. At this occasion, light of a same color emitted from the specific display pixel and the display pixel 110 adjacent to the specific display pixel is applied to the entire specific microlens 21α. Light having entered the respective microlenses 21 is concentrated by the lens sheet 30 and is superimposed on one another. More specifically, the light having entered the respective microlenses 21 is concentrated by the lens sheet 30 and is superimposed on one another so that the diameter φ1 at the pupil position of the eye 210 is smaller (for example, in a range from 0.1 mm to 3 mm both inclusive) than the diameter φ2 of the pupil of the eye 210.

[Effects]

Next, description is given of effects by the optical sheet 1 according to the present embodiment. In the optical sheet 1 according to the present embodiment, light emitted from the sub-pixels 111 of all kinds enters the specific pinhole 11a and is diffracted by the specific pinhole 11α. This causes each thus-diffracted light outputted from the specific pinhole 11α enters the specific microlens 21α. As described above, in the present embodiment, the diffraction effect by the pinhole 11 is used; therefore, a part of the light emitted from the sub-pixels 111 of all kinds is outputted from the specific pinhole 11α at an exit angle smaller than an entry angle to enter the specific microlens 21α. Accordingly, even in a case where a clearance between the pinhole mask 10 and the display pixel 110 is narrowed, it is possible to suppress a decline in color reproducibility. In other words, it is possible to narrow the clearance between the pinhole mask 10 and the display pixel 110 while suppressing a decline in color reproducibility. This makes it possible to achieve the optical sheet 1 having a thin thickness.

Moreover, in the present embodiment, the diffraction effect by the pinhole 11 is used; therefore, it is not necessary to provide a scattering plate or a diffusion plate in the clearance between the pinhole mask 10 and the display pixel 110 to suppress a decline in color reproducibility. This makes it possible to achieve high contrast and high light transmittance by absence of the scattering plate and the diffusion plate.

Further, in the present embodiment, the diameter $\phi_{hole1}$ of the pinhole 11 satisfies the expression (2). Accordingly, light of a same color emitted from the specific display pixel and the display pixel 110 adjacent to the specific display pixel is applied to the entire specific microlens 21α. This makes it possible to achieve high color reproducibility and less color unevenness.

2. Modification Examples of First Embodiment

In the following, description is given of various modification examples of the display device 1 according to the foregoing embodiment. Note that same components as the components of the display device 1 according to the foregoing embodiment are denoted by same reference numerals, and redundant description thereof is omitted.

Modification Example 1

In the foregoing embodiment, one of the plurality of pinholes 11 is assigned to each of the microlenses 21. However, in the foregoing embodiment, two or more of the plurality of pinholes 11 may be assigned to each of the microlenses 21. At this occasion, the array pitch ΔLa of the plurality of pinholes 11 is smaller than the array pitch ΔLc of the plurality of microlenses 21, and is, for example, 1/n (where n is a positive integer) of the array pitch ΔLc. The array pitch ΔLb of the plurality of pinholes 11 is smaller than the array pitch ΔLd of the plurality of microlenses 21, and is, for example, 1/n of the array pitch ΔLd.

For example, four of the plurality of pinholes 11 are assigned to each of the microlenses 21, as illustrated in FIGS. 8A, 8B, and 8C. FIG. 8A illustrates a planar configuration example of the pinhole mask 10. FIG. 8B illustrates a planar configuration example of the microlens array 20. FIG. 8C illustrates a planar configuration example in a case where the pinhole mask 10 and the microlens array 20 are superimposed on each other. At this occasion, the array pitch ΔLa of the plurality of pinholes 11 is ½ of the array pitch ΔLc. The array pitch ΔLb of the plurality of pinholes 11 is ½ of the array pitch ΔLd.

Modification Example 2

In the foregoing embodiment and modification example 1, an array direction of the plurality of microlenses 21 and an array direction of the plurality of pinholes 11 are coincident or substantially coincident with each other. However, in the foregoing embodiment and modification example 1, in a case where the array pitch ΔLa and the array pitch ΔLb are equal to each other, and the array pitch ΔLc and the array pitch ΔLd are equal to each other, the array direction of the plurality of microlenses 21 may be shifted by 45° with respect to the array direction of the plurality of pinholes 11. At this occasion, the line segment Lc is shifted in a clockwise direction by 45° with respect to the line segment La, and the line segment Ld is shifted in a clockwise direction by 45° with respect to the line segment Lb. Moreover, the array pitch ΔLa of the plurality of pinholes 11 is $1/n \times 1/\sqrt{2}$ of the array pitch ΔLc, and the array pitch ΔLb of the plurality of pinholes 11 is $1/n \times 1/\sqrt{2}$ of the array pitch ΔLd.

For example, the array pitch ΔLa of the plurality of pinholes 11 is $1/\sqrt{2}$ of the array pitch ΔLc, and the array pitch ΔLb of the plurality of pinholes 11 is $1/\sqrt{2}$ of the array pitch ΔLd, as illustrated in FIGS. 9A, 9B, and 9C. FIG. 9A illustrates a planar configuration example of the pinhole mask 10. FIG. 9B illustrates a planar configuration example of the microlens array 20. FIG. 9C illustrates a planar configuration example in a case where the pinhole mask 10 and the microlens array 20 are superimposed on each other.

Modification Example 3

In the foregoing embodiment, two array directions of the plurality of pinholes 11 are orthogonal to each other, and two array directions of the plurality of microlenses 21 are orthogonal to each other. Moreover, two array directions of the plurality of display pixels 110 are orthogonal to each other, as well. However, in the foregoing embodiment and modification example 1, in a case where the array pitches ΔLa, ΔLb, ΔLc, and ΔLd are equal to one another, the two array directions of the plurality of pinholes 11 may intersect with each other by 60°, and further, two array directions of the plurality of microlenses 21 may intersect with each other by 60°. Moreover, the two array directions of the display pixels 110 may intersect with each other by 60°. At this occasion, the array direction of the plurality of microlenses 21 and the array direction of the plurality of pinholes 11 are coincident with each other or intersect with each other within a range of ±0.5°.

For example, each of the microlenses 21 has a regular hexagonal shape, and the plurality of microlenses 21 are disposed so that a clearance between adjacent ones of the microlenses 21 is minimized, as illustrated in FIGS. 10A, 10B, and 10C. FIG. 10A illustrates a planar configuration example of the pinhole mask 10. FIG. 10B illustrates a planar configuration example of the microlens array 20. FIG. 10C illustrates a planar configuration example in a case where the pinhole mask 10 and the microlens array 20 are superimposed on each other.

In a plan view of the pinhole mask 10 and the microlens array 20, the center of each of the pinholes 11 is preferably superimposed on the center of relevant one of the microlenses 21. It is to be noted that in the plane view of the pinhole mask 10 and the microlens array 20, the center of each of the pinholes 11 may be shifted from the center of relevant one of the microlenses 21 by predetermined magnitude toward a specific direction. In other words, in a case where the optical sheet 1 is bonded to the display surface 200A or the display surface 300A, the coordinate position of the optical sheet 1 in the display surface 200A or the display surface 300A is not particularly limited.

Modification Example 4

In the foregoing embodiment, each of the display pixels 110 is configured of three sub-pixels 111. However, in the foregoing embodiment and modification examples 1 to 3, each of the display pixels 110 may be configured of four or more sub-pixels 111. For example, each of the display pixels 110 may be configured of six sub-pixels 111, as illustrated in FIG. 11. FIG. 11 illustrates a planar configuration example of the display pixel 110.

At this occasion, each of the display pixels 110 is configured of the sub-pixels 111 of three kinds, that is, two sub-pixels 111R, two sub-pixels 111G, and two sub-pixels 111B. For example, the two sub-pixels 111R are disposed side by side in a vertical direction of the display pixel 110 at a leftward position of the display pixel 110. For example, the two sub-pixels 111G are disposed side by side in the vertical direction of the display pixel 100 at a central position of the display pixel 110. For example, the two sub-pixels 111B are disposed side by side in the vertical direction of the display pixel 110 at a rightward position of the display pixel 110.

Modification Example 5

In the foregoing embodiment, each of the display pixels 110 is configured of the sub-pixels 111 of three kinds. However, in the foregoing embodiment and modification examples 1 to 3, each of the display pixels 110 may be configured of the sub-pixels 111 of four or more kinds. For example, each of the display pixels 110 may be configured of the sub-pixels 111 of four kinds, as illustrated in FIG. 12. FIG. 12 illustrates a planar configuration example of the display pixel 110.

At this occasion, in each of the display pixels 110, the sub-pixels 111 of four kinds are configured of, for example, the sub-pixel 111R, the sub-pixel 111G, the sub-pixel 111B, and a sub-pixel 111W. The sub-pixel 111W emits white light. The sub-pixel 111W includes, for example, a self-luminous element that generates light itself. It is to be noted that the sub-pixel 111W may include, for example, an element that modulates incoming light.

Moreover, each of the display pixels 110 is configured of the sub-pixels 111 of four kinds, for example, two sub-pixels 111R, two sub-pixels 111G, two sub-pixels 111B, and two sub-pixels 111W. For example, the two sub-pixels 111R are disposed side by side in the vertical direction of the display pixel 100 at a leftward position of the display pixel 110. For example, the two sub-pixels 111G are disposed side by side in the vertical direction of the display pixel 100 at a center left position of the display pixel 110. For example, the two sub-pixels 111B are disposed side by side in the vertical direction of the display pixel 100 at a center right position of the display pixel 110. For example, the two sub-pixels 111W are disposed side by side in the vertical direction of the display pixel 100 at a leftward position of the display pixel 110.

Modification Example 6

In the foregoing embodiment and modification examples 1 to 5, each of the sub-pixels 111 has a rectangular shape. However, in the foregoing embodiment and modification examples 1 to 5, each of the sub-pixels 111 may have a square shape. At this occasion, in each of the display pixels 100, the plurality of sub-pixels 111 may be disposed, for example, in a grid pattern, as illustrated in FIG. 13. FIG. 13 illustrates a planar configuration example of the display pixel 110.

In the modification examples 1 to 6, as with the foregoing embodiment, the diffraction effect by the pinhole 11 is used, which makes it possible to achieve the optical sheet 1 having a thin thickness, and to achieve high contrast and high light transmittance by absence of the scattering plate and the diffusion plate. Moreover, in the modification examples 1 to 6, as with the foregoing embodiment, the diameter $\phi_{hole1}$ of the pinhole 11 satisfies the expression (2), which makes it possible to achieve high color reproducibility and less color unevenness.

3. Second Embodiment

Next, description is given of an optical sheet 2 according to a second embodiment of the present technology. The optical sheet 2 corresponds to a specific example of an "optical sheet" of the present technology. FIG. 14 illustrates a schematic configuration example of the optical sheet 2 according to the second embodiment of the present technology. The optical sheet 2 corresponds to the optical sheet 1 from which the lens sheet 30 and the spacer 50 are omitted and in which a pinhole mask 60 is provided in place of the pinhole mask 10. The optical sheet 2 is suitably bonded to, for example, the display surface 200A or the display surface 300A, as with the optical sheet 1.

The optical sheet 2 includes, for example, the pinhole mask 60, the microlens array 20, and the spacer 40, as illustrated in FIG. 14. The pinhole mask 60 corresponds to a specific example of a "pinhole mask" of the present technology. A surface of the pinhole mask 60 serves as a light entry surface of the optical sheet 2, and a surface of the microlens array 20 serves as a light exit surface of the optical sheet 2. It is to be noted that an adhesive layer, a pressure-sensitive adhesive layer, or an electrically-charged layer may be provided on the surface (light entry surface) of the pinhole mask 60. Moreover, a protective film that protects the microlens array 20 may be provided on the surface (the light exit surface) of the microlens array 20.

(Pinhole Mask)

The pinhole mask 60 includes a plurality of pinholes 61 that each have a diffraction effect with respect to light emitted from the display pixel 110. The pinholes 61 correspond to a specific example of "pinholes" of the present technology. The pinholes 61 each have a diameter having the diffraction effect with respect to light (visible light) emitted from the display pixel 110, and has, for example, a diameter of 7.5 μm. The pinholes 61 are provided in a sheet-like light-blocking member. Accordingly, the pinhole mask 60 allows light emitted from the display pixel 110 to pass therethrough via the respective pinholes 61. The pinhole mask 60 is formed, for example, by coating the light entry surface of the spacer 40 with a light-blocking material including, for example, black carbon and thereafter forming a plurality of apertures in the light-blocking material with which the light entry surface is coated. The pinhole mask 60 may be formed, for example, by forming a thin film of chromium on the light entry surface of the spacer 40 and thereafter etching the thin film of chromium to form apertures.

FIG. 15 illustrates a planar configuration example of the pinhole mask 60 and the microlens array 20. The plurality of pinholes 61 are disposed in a grid pattern. The plurality of pinholes 61 are disposed side by side in a direction parallel to a line segment Le and are disposed side by side in a direction parallel to a line segment Lf orthogonal or substantially orthogonal to the line segment Le. The plurality of pinholes 61 are disposed side by side in the direction parallel to the line segment Le with an array pitch ΔLe. The array pitch ΔLe is larger than the array pitch Lc so that light diffracted by the respective pinholes 61 is superimposed on one another at the pupil position of the eye 210, and is, for example, 100.75 μm. The plurality of pinholes 61 are disposed side by side in the direction parallel to the line segment Lf with an array pitch ΔLf. The array pitch ΔLf is larger than the array pitch Ld so that light diffracted by the respective pinholes 61 are superimposed on one another at the pupil position of eye 210, and is, for example, 100.75 μm.

The plurality of pinholes 61 are disposed side by side in a direction within a range of ±1.0° of the direction parallel to the line segment Lc, and are disposed side by side in a direction within a range of ±1.0° of the direction parallel to the line segment Ld. Herein, the direction parallel to the line segment Le corresponds to the direction within the range of ±1.0° of the direction parallel to the line segment Lc. The direction parallel to the line segment Lf corresponds to the direction within the range of ±1.0° of the direction parallel to the line segment Ld.

The plurality of microlenses 21 are disposed side by side in the direction parallel to the line segment Lc with the array pitch ΔLc. The array pitch ΔLc is smaller than the array pitch Le, and is, for example, 100 μm. The plurality of microlenses 21 are disposed side by side in the direction parallel to the line segment Ld with the array pitch ΔLd. The array pitch ΔLd is smaller than the array pitch Lf, and is, for example, 100 μm.

The pinhole mask 60 and the microlens array 20 superimpose light diffracted by the respective pinholes 61. For example, the pinhole mask 60 and the microlens array 20 are configured to superimpose light diffracted by the respective pinholes 61 on each other so that the diameter φ1 of the light at a predetermined position is smaller (for example, in a range from 0.1 mm to 3 mm both inclusive) than the diameter φ2 of the pupil of the eye 210, as illustrated in FIG. 16. The "predetermined position" is specifically the pupil position of the eye 210. For example, in a case where D2 is equal to 1500 μm and the distance between the microlens 21 and the eye 210 is equal to 200 mm, the diameter φ1 of a light beam having passed through each of the pinholes 11 at the pupil position of the eye 210 is 1 mm. FIG. 16 illustrates a cross-sectional configuration example of the optical sheet 2 and the display panel 100 in a case where the optical sheet 2 is bonded to the display surface 100A of the display panel 100.

More specifically, one of the plurality of microlenses 21 is assigned to each of the pinholes 61. The microlenses 21 and the display pixel 110 are disposed to face each other. In a plan view of the pinhole mask 60 and the microlens array 20, a center of a certain one of the pinholes 61 is superimposed on a center of a certain one of the microlenses 21. FIG. 15 illustrates an example in which a point (hereinafter referred to as "point P5") where the center of the pinhole 61 and the center of the microlens 21 are superimposed on each other is located at a center of the pinhole mask 60. Note that the point P5 may be located at a position different from the center of the pinhole mask 60. In a plan view of the pinhole mask 60 and the microlens array 20, the center of each of the pinholes 61 is shifted from a position facing the center of the microlens 21 that faces that pinhole 61 toward a direction of radiation from the point P5 as a center, and an amount of such shift is increased with an increase in a distance from the point P5. It is to be noted that the array pitches ΔLe and ΔLf each are a fixed value irrespective of the location.

Next, description is given of positions and sizes of the sub-pixels 111 and the pinholes 61 with reference to FIGS. 16, 17, 18, and 19. FIGS. 17 and 18 each illustrate an example of positions and sizes of the sub-pixels 111, the pinholes 61, and the microlenses 21. FIG. 19 illustrates a planar configuration example of the display pixel 110.

Herein, it is assumed that in a case where the optical sheet 2 is bonded to the display surface 100A, a member having a scattering or diffusion action is not provided in an optical path of light emitted from each of the sub-pixels 111. At this occasion, the positions and sizes of the plurality of pinholes 61 and the plurality of microlenses 21 allow light emitted from the sub-pixels 111 of all kinds to enter a specific pinhole 61α serving as one common pinhole 61, and be diffracted by the specific pinhole 61α, thereby allowing each thus-diffracted light outputted from the specific pinhole 61α to enter the specific microlens 21α that is one of the microlenses 21.

More specifically, the positions and sizes of the plurality of pinholes 61 and the plurality of microlenses 21 satisfy the following expression (5).

$$\theta 4 > \theta 5 \quad (5)$$

where θ4 is an angle between a first line segment L11 passing through a center of the specific pinhole 61α and a point P6 and a second line segment L12 passing through the center of the specific pinhole 61α and a center of the specific microlens 21α, θ5 is an angle between a third line segment L13 passing through the center of the specific pinhole 61α and the point P2 and the second line segment L12, and P6 is a point farthest from the specific pinhole 61α of the sub-pixel 111 (a first sub-pixel) farthest from the center of the specific pinhole 61α in the sub-pixels 111 of all kinds closest to the specific pinhole 61α.

At this occasion, for example, the point P6 is located at a upper left corner of the sub-pixel 111R, as illustrated in FIGS. 17 and 19. The expression (5) indicates that, assuming that the pinholes 61 do not have a diffraction effect, a part of light having entered the specific pinhole 61α of the light emitted from the sub-pixel 111 (the first sub-pixel) enters the specific microlens 21α. In other words, the expression (5) is premised on D3<D4. A distance D4 is, for example, magnitude within a range of ±10% of the focal length of the microlens 21.

D3 is a distance between the center of the specific pinhole 61α and the display pixel 110, and D4 is a distance between the center of the specific microlens 21α and the center of the specific pinhole 61α.

The "sub-pixels 111 of all kinds closest to the specific pinhole 61α" include, for example, the sub-pixels 111 (the sub-pixels 111G and 111B) of two kinds included in the specific display pixel and the sub-pixel 111 (the sub-pixel 111R) of the remaining one kind in the display pixel 110 adjacent to the specific display pixel, as illustrated in FIG. 17. It is to be noted that depending on the position of the specific pinhole 61α, the "sub-pixels 111 of all kinds closest to the specific pinhole 61α" may include the sub-pixels 111 (the sub-pixel 111G, 111B, and 111R) of all kinds in the specific display pixel.

Moreover, a diameter $\phi_{hole}$ of the specific pinhole 61α satisfies the following expression (6). The expression (6) indicates that light having entered the specific pinhole 61α from the specific display pixel and the display pixel 110 adjacent to the specific display pixel is diffracted by the diffraction angle $\theta_{diff}$ to enter the specific microlens 21α, which causes light of a same color to be applied to the entire specific microlens 21α. In other words, the expression (6) is an expression to achieve high color reproducibility and less color unevenness.

$$\phi_{hole} < \lambda/\theta 6 \quad (6)$$

where θ6 is an angle between a fourth line segment L14 passing through the center of the specific pinhole 61α and a point P7 and a fifth line segment L15 passing through the center of the specific pinhole 61α and a point P8, P7 is a point closest to the specific pinhole 61α of the sub-pixel 111 (the first sub-pixel), and P8 is a point intersecting a sixth line segment L16 (refer to FIG. 19) and closest to the specific pinhole 61α of the sub-pixel 11 (a second sub-pixel), where the sub-pixel 111 (the second sub-pixel) is closest to the center of the specific pinhole 61α in a plurality of sub-pixels 111 of the same kind as the kind of the sub-pixel 111 (the first sub-pixel) adjacent to the sub-pixel 111 (the first sub-pixel) in a plan view of the sub-pixel (the second sub-pixel), and the sixth line segment L16 passes through a point facing the center of the specific pinhole 61α and the point P7.

The expression (6) is obtained by the following expressions (7) and (8).

$$\theta_{diff} = \lambda/(2 \times \phi_{hole2}) \quad (7)$$

$$2 \times \theta_{diff} > \theta 6 \quad (8)$$

The point P7 is located in, for example, a lower portion of a left edge of the sub-pixel 111R included in the display pixel 110 adjacent to the display pixel 110 facing the specific pinhole 11α, as illustrated in FIG. 19. The point P8 is located in, for example, a lower portion of a right edge of the sub-pixel 111R included in the display pixel 110 facing the specific pinhole 11α, as illustrated in FIG. 19.

The foregoing expressions (5) to (8) are represented by the diffraction effect by the pinhole 61 and geometric configurations of the sub-pixels 111, the pinholes 61, and the microlenses 21. The foregoing expressions (5) to (8) suggest that even though the member having a scattering or diffusion action is not provided between the display pixel 110 and the pinhole mask 60, high color reproducibility and less color unevenness are achievable. In other words, in a case where the positions and sizes of the plurality of pinholes 61 and the plurality of microlenses 21 satisfy the expression (6), and the diameter $\phi_{hole2}$ of the specific pinhole 61α satisfies the expression (6), it is not necessary to provide a scattering plate or a diffusion plate in order to improve color reproducibility and reduce color unevenness. The scattering plate or the diffusion plate may be provided between the display pixel 110 and the pinhole mask 60; however, in such a case, the scattering plate or the diffusion plate may rather cause a concern that contrast or light transmittance declines.

As can be seen from the expression (6), light of a same color emitted from the specific display pixel and the display pixel 110 adjacent to the specific display pixel is applied to the entire specific microlens 21α. In a case where both the center of each of the pinholes 61 and the center of each of the microlenses 21 are superimposed on the center of relevant one of the display pixels 110, an area illuminated with the light emitted from the specific display pixel of the specific microlens 21α is wider than an area illuminated with the light emitted from the display pixel 110 adjacent to the specific display pixel of the specific microlens 21α. In contrast, in a case where both the center of each of the pinholes 61 and the center of each of the microlenses 21 are shifted from the center of the relevant one of the display pixels 110 by the predetermined magnitude toward the specific direction, the area illuminated with the light emitted from the display pixel 110 adjacent to the specific display pixel of the specific microlens 21α may be wider than the area illuminated with the light emitted from the specific display pixel of the specific microlens 21α in some cases. Accordingly, a ratio of both the respective areas illuminated with the light varies depending on the central positions of each of the pinholes 61 and each of the microlenses 21; however, independent of the ratio of both the respective areas illuminated with the light, light of a same color is applied to the entire specific microlens 21α. This shows that in a case where the optical sheet 2 is bonded to the display surface 100A, the coordinate position of the optical sheet 2 in the display surface 100A is not particularly limited.

[Workings]

Next, description is given of workings of the optical sheet 2 according to the present embodiment. Inputting an image signal from outside to the display panel 100 causes each of the display pixels 110 to emit light corresponding to the image signal. More specifically, the sub-pixel 111R emits red light, the sub-pixel 111G emits green light, and the sub-pixel 111B emits blue light. Light emitted from each of the sub-pixels 111 is diffracted by the pinhole 61 to enter the microlens 21. More specifically, light emitted from each of the sub-pixels 111 of the specific display pixel and light emitted from the display pixel 110 adjacent to the specific display pixel are diffracted by the specific pinhole 61α to enter the specific microlens 21α. At this occasion, light of a same color emitted from the specific display pixel and the display pixel 110 adjacent to the specific display pixel is applied to the entire specific microlens 21α. Light having entered the respective microlenses 21 is superimposed on one another by a positional relationship between the microlenses 21 and the pinholes 61. More specifically, the light having entered the respective microlenses 21 is superimposed on one another so that the diameter φ1 at the pupil position of the eye 210 is smaller (for example, in a range from 0.1 mm to 3 mm both inclusive) than the diameter φ2 of the pupil of the eye 210.

[Effects]

Next, description is given of effects by the optical sheet 2 according to the present embodiment. In the optical sheet 2 according to the present embodiment, light emitted from the sub-pixels 111 of all kinds enters the specific pinhole 61α and is diffracted by the specific pinhole 61α. This causes each thus-diffracted light outputted from the specific pinhole 61α enters the specific microlens 21α. As described above, in the present embodiment, the diffraction effect by the pinhole 61 is used; therefore, a part of the light emitted from the sub-pixels 111 of all kinds is outputted from the specific pinhole 61α at an exit angle smaller than an entry angle to enter the specific microlens 21α. Accordingly, even in a case where the clearance between the pinhole mask 60 and the display pixel 110 is narrowed, it is possible to suppress a decline in color reproducibility. In other words, it is possible to narrow the clearance between the pinhole mask 60 and the display pixel 110 while suppressing a decline in color reproducibility. This makes it possible to achieve the optical sheet 2 having a thin thickness.

Moreover, in the present embodiment, the diffraction effect by the pinhole 61 is used; therefore, it is not necessary to provide a scattering plate or a diffusion plate in the clearance between the pinhole mask 60 and the display pixel 110 to suppress a decline in color reproducibility. This makes it possible to achieve high contrast and high light transmittance by absence of the scattering plate and the diffusion plate.

Further, in the present embodiment, the diameter $\phi_{hole2}$ of the pinhole 61 satisfies the expression (6). Accordingly, light of a same color emitted from the specific display pixel and the display pixel 110 adjacent to the specific display pixel is applied to the entire specific microlens 21α. This makes it possible to achieve high color reproducibility and less color unevenness.

Modification Examples of Second Embodiment

Modification Example 1

In the foregoing second embodiment, one of the plurality of pinholes 61 is assigned to each of the microlenses 21. However, in the foregoing second embodiment, two or more of the plurality of pinholes 61 may be assigned to each of the microlenses 21. At this occasion, the plurality of pinholes 61 are located at a position where light from the pinholes 61 is concentrated at a predetermined position. The "predetermined position" is specifically the pupil position of the eye 210. The array pitch ΔLe of the plurality of pinholes 61 is, for example, 1/n (where n is a positive integer) of the array pitch ΔLc of the plurality of microlenses 21. Even in such a case, effects similar to those in the second embodiment are achievable.

Modification Example 2

In the foregoing second embodiment and modification example 1, the array direction of the plurality of microlenses 21 and the array direction of the plurality of pinholes 61 are coincident or substantially coincident with each other. However, in the foregoing second embodiment and modification example 1, in a case where the array pitch ΔLc and the array pitch ΔLd are equal to each other, and the array pitch ΔLe and the array pitch ΔLf are equal to each other, the array direction of the plurality of microlenses 21 may be shifted by 45° with respect to the array direction of the plurality of pinholes 61. At this occasion, the line segment Lc is shifted in a clockwise direction by 45° with respect to the line segment Le, and the line segment Ld is shifted in a clockwise direction by 45° with respect to the line segment Lf. Moreover, the array pitch ΔLe of the plurality of pinholes 61 is 1/n×1/√2 of the array pitch ΔLc, and the array pitch ΔLf of the plurality of pinhole 61 is 1/n×1/√2 of the array pitch ΔLd.

Modification Example 3

FIG. 20 illustrates a modification example of a schematic configuration of the optical sheet 2. In the foregoing second embodiment, each of the microlenses 21 has a convex shape projected toward light exit side; however, the each of the microlenses 21 may have, for example, a convex shape projected toward light entry side, as illustrated in FIG. 20. Even in such a case, effects similar to those in the second embodiment are achievable.

5. Third Embodiment

Next, description is given of a display device 3 according to a third embodiment of the present technology. The display device 3 corresponds to a specific example of a "display device" of the present technology. FIG. 21 illustrates a schematic configuration example of the display device 3 according to the present embodiment. The display device 3 includes the display panel 100 including the plurality of display pixels 110 and the optical sheet 1 provided at a position facing the plurality of display pixels 110. The plurality of the display pixels 110 each include the plurality of sub-pixels 111. The optical sheet 1 is one of the optical sheets 1 according to the foregoing first embodiment and modification examples thereof (the modification examples 1 to 6). The display panel 100 includes a protective layer 120 on an outermost surface 100B (a surface on the optical sheet 1 side) of the display panel 100. The protective layer 120 is a light-transmissive protective glass or protective film. The optical sheet 1 is bonded to the outermost surface 100B (that is, the protective layer 120) of the display panel 100. The outermost surface 100B corresponds to the foregoing display surface 100A.

The display device 3 includes a fixing layer 70 that bonds the optical sheet 1 and the protective layer 120 together. The fixing layer 70 is, for example, an adhesive layer, a pressure-sensitive adhesive layer, or an electrically-charged film. The electrically-charged film is a film charged with static electricity, and is bonded to the outermost surface 100B (that is, the protective layer 120) of the display panel 100 with use of the static electricity. The fixing layer 70 is made of a light-transmissive material. In the present embodiment, the fixing layer 70 does not have a function of actively scattering or diffusing light, unlike a scattering plate or a diffusion plate. In other words, the display device 3 is optically designed not to cause any difficulty even if the fixing layer 70 serves as a scattering plate or a diffusion plate. It is to be noted that the fixing layer 70 may be omitted, as illustrated in FIG. 22. In this case, the pinhole mask 10 may have a function of the electrically-charged film.

In the present embodiment, as with the foregoing first embodiment, the diffraction effect by the pinhole 11 is used, which makes it possible to reduce the thickness of the optical sheet 1, and to achieve high contrast and high light transmittance by absence of the scattering plate and the diffusion plate. Moreover, in the present embodiment, as with the foregoing first embodiment, the diameter $\phi_{hole1}$ of the pinhole 11 satisfies the expression (2), which makes it possible to achieve high color reproducibility and less color unevenness.

6. Fourth Embodiment

Next, description is given of a display device 4 according to a fourth embodiment of the present technology. The display device 4 corresponds to a specific example of a "display device" of the present technology. FIG. 23 illustrates a schematic configuration example of the display device 4 according to the present embodiment. The display device 4 includes the display panel 100 including the plurality of display pixels 110 and the optical sheet 2 provided at a position facing the plurality of display pixels 110. The plurality of the display pixels 110 each include the plurality of sub-pixels 111. The optical sheet 2 is one of the optical sheets 2 according to the foregoing second embodiment and modification examples thereof (the modification examples 1 and 2). The display panel 100 includes the protective layer 120 on the outermost surface 100B (a surface on the optical sheet 2 side) of the display panel 100. The optical sheet 2 is bonded to the outermost surface 100B (that is, the protective layer 120) of the display panel 100.

The display device 4 includes the fixing layer 70 that bonds the optical sheet 2 and the protective layer 120 together. The fixing layer 70 is, for example, an adhesive layer, a pressure-sensitive adhesive layer, or an electrically-charged film, as with the foregoing third embodiment. The electrically-charged film is a film charged with static electricity, and is bonded to the outermost surface 100B (that is, the protective layer 120) of the display panel 100 with use of the static electricity. The fixing layer 70 is made of a light-transmissive material. In the present embodiment, the fixing layer 70 does not have a function of actively scattering or diffusing light, unlike a scattering plate or a diffusion plate. In other words, the display device 4 is optically designed not to cause any difficulty even if the fixing layer 70 serves as a scattering plate or a diffusion plate. It is to be noted that the fixing layer 70 may be omitted, as illustrated in FIG. 24. In this case, the pinhole mask 60 may have a function of the electrically-charged film.

In the present embodiment, as with the foregoing second embodiment, the diffraction effect by the pinhole 61 is used, which makes it possible to reduce the thickness of the optical sheet 2, and to achieve high contrast and high light transmittance by absence of the scattering plate and the diffusion plate. Moreover, in the present embodiment, as with the foregoing second embodiment, the diameter $\phi_{hole2}$ of the pinhole 61 satisfies the expression (6), which makes it possible to achieve high color reproducibility and less color unevenness.

7. Fifth Embodiment

Next, description is given of an electronic apparatus 200 according to a fifth embodiment of the present technology. FIG. 25 illustrates a schematic configuration example of the electronic apparatus 200 according to the present embodiment. The electronic apparatus 200 is, for example, a mobile terminal including the display surface 200A on a main surface of a plate-like housing. The electronic apparatus 200 corresponds to a specific example of an "electronic apparatus" of the present technology. The display surface 200A corresponds to a specific example of a "display surface" and an "outermost surface" of the present technology. The electronic apparatus 200 includes, for example, the display device 3 or the display device 4 at a position of the display surface 200A. The display device 3 includes the display panel 100 including the plurality of display pixels 110 and the optical sheet 1 provided at a position facing the plurality of display pixels 110. The plurality of display pixels 110 each include the plurality of sub-pixels 111. The optical sheet 1 is one of the optical sheets 1 according to the foregoing first embodiment and the modification examples thereof (the modification examples 1 to 6). The display device 4 includes the display panel 100 including the plurality of display pixels 110 and the optical sheet 2 provided at a position facing the plurality of display pixels 110. The plurality of display pixels 110 each include the plurality of sub-pixels 111. The optical sheet 2 is one of the optical sheets 2 according to the foregoing second embodiment and the modification examples thereof (the modification examples 1 and 2).

The optical sheets 1 and 2 each may be attachable to and detachable from the display surface 200A. In other words, it is not necessary for a user of the electronic apparatus 200 to particularly pay attention to the coordinate positions of the optical sheets 1 and 2 in the display surface 200A.

In the present embodiment, as with the foregoing first and second embodiments, in the optical sheets 1 and 2, the diffraction effect by the pinholes 11 and 61 is used, which make it possible to reduce the thicknesses of the optical sheets 1 and 2, and to achieve high contrast and high light transmittance by absence of the scattering plate and the diffusion plate. Moreover, in the present embodiment, as with the foregoing first embodiment, the diameter $\phi_{hole1}$ of the pinholes 11 and 61 satisfies the expression (2) or (6), which makes it possible to achieve high color reproducibility and less color unevenness.

8. Sixth Embodiment

Next, description is given of an electronic apparatus 300 according to a sixth embodiment of the present technology. FIG. 26 illustrates a schematic configuration example of the electronic apparatus 300 according to the present embodiment. The electronic apparatus 300 is, for example, a wearable device of which the display surface 300A is disposed in front of each eyeball of a user wearing the electronic apparatus 300 on, for example, his ear. The electronic apparatus 300 corresponds to a specific example of an "electronic apparatus" of the present technology. The display surface 300A corresponds to a specific example of a "display surface" and an "outermost surface" of the present technology. The electronic apparatus 300 includes, for example, the display device 3 or the display device 4 at a position of the display surface 300A.

The optical sheets 1 and 2 each may be attachable to and detachable from the display surface 300A. In other words, it is not necessary for the user of the electronic apparatus 300 to particularly pay attention to the coordinate positions of the optical sheets 1 and 2 in the display surface 300A.

In the present embodiment, as with the foregoing first and second embodiments, in the optical sheets 1 and 2, the diffraction effect by the pinholes 11 and 61 is used, which make it possible to reduce the thicknesses of the optical sheets 1 and 2, and to achieve high contrast and high light transmittance by absence of the scattering plate and the diffusion plate. Moreover, in the present embodiment, as with the foregoing first embodiment, the diameter $\phi_{hole1}$ of the pinholes 11 and 61 satisfies the expression (2) or (6), which makes it possible to achieve high color reproducibility and less color unevenness.

9. Common Modification Examples

In the first embodiment, the modification examples 1 to 6, and the third embodiment, for example, the spacer 40 may be omitted, and the microlens array 20 may be formed thick by the thickness of the spacer 40, as illustrated in FIG. 27. Moreover, in the second embodiment and the fourth embodiment, for example, the spacer 40 may be omitted, and the microlens array 20 may be formed thick by the thickness of the spacer 40, as illustrated in FIG. 28. Such a case makes it possible to reduce the number of components by one, and further to reduce the number of reflective surfaces by one (a boundary between the spacer 40 and the microlens array 20).

Moreover, in the first embodiment, the modification examples 1 to 6, and the third embodiment, a scattering plate or a diffusion plate may be provided between the display pixels 110 and the pinhole mask 10. Moreover, in the second embodiment and the fourth embodiment, a scattering plate or a diffusion plate may be provided between the display pixels 110 and the pinhole mask 60.

Although description has been made by giving the four embodiments and a number of modification examples as mentioned above, the present technology is not limited thereto and may be modified in a variety of ways. It is to be noted that effects described herein are merely examples. Effects of the present technology are not limited to the effects described herein. Effects of the present technology may include other effects than the effects described herein.

Moreover, for example, the present technology may have the following configurations.

(1)

A display device, including:

a display panel including a plurality of display pixels that each include a plurality of sub-pixels; and an optical sheet provided at a position facing the plurality of display pixels, in which the optical sheet includes a pinhole mask including a plurality of pinholes that have a diffraction effect with respect to light emitted from the display pixels, and a microlens array including a plurality of microlenses, and assuming that a member having a scattering or diffusion action is not provided in an optical path of light emitted from each of the sub-pixels, positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses.

(2)

The display device according to (1), in which the positions and sizes of the plurality of pinholes and the plurality of microlenses satisfy the following expression (1), $$\theta_1 > \theta_2 \quad (1)$$

where θ1 is an angle between a first line segment passing through a center of the specific pinhole and a point P1 and a second line segment passing through the center of the specific pinhole and a center of the specific microlens, θ2 is an angle between a third line segment passing through the center of the specific pinhole and a point P2 and the second line segment, P1 is a point farthest from the specific pinhole of a first sub-pixel farthest from the center of the specific pinhole in the sub-pixels of all kinds closest to the specific pinhole, and P2 is an end of the specific microlens.

(3)

The display device according to (2), in which a diameter φ of the specific pinhole satisfies the following expression (2), $$\phi < \lambda/\theta_3 \quad (2)$$

where λ is a central wavelength of light emitted from the sub-pixel,

θ3 is an angle between a fourth line segment passing through the center of the specific pinhole and a point P3 and a fifth line segment passing through the center of the specific pinhole and a point P4, P3 is a point closest to the specific pinhole of the first sub-pixel, and P4 is a point intersecting a sixth line segment and closest to the specific pinhole of a second sub-pixel, where the second sub-pixel is closest to the center of the specific pinhole in a plurality of sub-pixels of a same kind as a kind of the first sub-pixel adjacent to the first sub-pixel in a plan view of the second sub-pixel, and the sixth line segment passes through a point facing the center of the specific pinhole and the point 3.

(4)

The display device according to any one of (1) to (3), in which the plurality of microlenses are disposed side by side in a first direction and are disposed side by side in a second direction intersecting the first direction, and the plurality of pinholes are disposed side by side in a direction within a range of ±1.0° of the first direction, and are disposed side by side in a direction within a range of ±1.0° of the second direction.

(5)

The display device according to any one of (1) to (4), further including a lens sheet that superimposes light having passed through the respective microlenses on one another, in which an array pitch of the plurality of pinholes is equal to an array pitch of the plurality of microlenses.

(6)

The display device according to (4), in which an array pitch of the plurality of pinholes is 1/n (where n is an integer of 2 or more) or $1/(n\sqrt{2})$ of an array pitch of the plurality of microlenses.

(7)

The display device according to (5), in which the pinhole mask, the microlens array, and the lens sheet are configured to superimpose light diffracted by the respective pinholes on one another to allow the light to have a diameter of 0.1 mm to 3 mm both inclusive at a predetermined position.

(8)

The display device according to (6), in which the pinhole mask, the microlens array, and the lens sheet are configured to superimpose light diffracted by the respective pinholes on one another to allow the light to have a diameter of 0.1 mm to 3 mm both inclusive at a predetermined position.

(9)

The display device according to any one of (1) to (4), in which an array pitch of the plurality of pinholes is larger than an array pitch of the plurality of microlenses to allow light diffracted by the respective pinholes to be superimposed on one another at a pupil position of an eye of a user.

(10)

The display device according to (9), in which the array pitch of the plurality of pinholes is 1/n (where n is an integer of 2 or more) or $1/(n\sqrt{2})$ of the array pitch of the plurality of microlenses.

(11)

The display device according to (9), in which the pinhole mask and the microlens array are configured to be superimposed on each other to allow light diffracted by each of the pinholes to have a diameter of 0.1 mm to 3 mm both inclusive at a predetermined position.

(12)

The display device according to any one of (1) to (3), in which the display panel includes a light-transmissive protective glass or protective film on an outermost surface on the optical sheet side of the display panel, and the optical sheet is bonded to the outermost surface on the optical sheet side.

(13)

The display device according to (12), in which the optical sheet includes an electrically-charged film charged with static electricity, and the optical sheet is bonded to the outermost surface on the optical sheet side with use of the static electricity of the electrically-charged film.

(14)

The display device according to (12), further including an adhesive layer or a pressure-sensitive adhesive layer that bonds the optical sheet and the protective glass or the protective film together.

(15)

An electronic apparatus provided with a display device, the display device including:

a display panel including a plurality of display pixels that each include a plurality of sub-pixels; and an optical sheet provided at a position facing the plurality of display pixels, in which the optical sheet includes a pinhole mask including a plurality of pinholes that have a diffraction effect with respect to light emitted from the display pixels, and a microlens array including a plurality of microlenses, and assuming that a member having a scattering or diffusion action is not provided in an optical path of light emitted from each of the sub-pixels, positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses.

(16)

An optical sheet suitable to be bonded to a display surface of a display panel, the display panel including a plurality of display pixels and the display surface, the plurality of display pixels each including a plurality of sub-pixels, the display surface being provided at a position facing the plurality of display pixels, the optical sheet including:

a pinhole mask including a plurality of pinholes that have a diffraction effect with respect to light emitted from the display pixels; and a microlens array including a plurality of microlenses, in which assuming that a member having a scattering or diffusion action is not provided in an optical path of light emitted from each of the sub-pixels in a state in which the optical sheet is bonded to the display surface, positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses.

The present application is based on and claims priority from Japanese Patent Application No. 2015-029917 filed in the Japan Patent Office on Feb. 18, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display device, comprising:

a display panel including a plurality of display pixels that each include a plurality of sub-pixels; and an optical sheet provided at a position facing the plurality of display pixels, wherein the optical sheet includes a pinhole mask including a plurality of pinholes that have a diffraction effect with respect to light emitted from the display pixels, and a microlens array including a plurality of microlenses, wherein a member having a scattering or diffusion action is not provided in an optical path of light emitted from each of the sub-pixels, and positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses, and wherein the positions and sizes of the plurality of pinholes and the plurality of microlenses satisfy the following expression (1), $$\theta 1 > \theta 2 \quad (1)$$

where θ1 is an angle between a first line segment passing through a center of the specific pinhole and a point P1 and a second line segment passing through the center of the specific pinhole and a center of the specific microlens, θ2 is an angle between a third line segment passing through the center of tyre specific pinhole and a point P2 and the second line segment, P1 is a point farthest from the specific pinhole of a first sub-pixel farthest from the center of the specific pinhole in the sub-pixels of all kinds closest to the specific pinhole, and P2 is an end of the specific microlens.

2. The display device according to claim 1, wherein a diameter φ of the specific pinhole satisfies the following expression (2), $$\phi < \lambda / \theta 3 \quad (2)$$

where λ is a central wavelength of light emitted from the sub-pixel,

θ3 is an angle between a fourth line segment passing through the center of the specific pinhole and a point P3 and a fifth line segment passing through the center of the specific pinhole and a point P4, P3 is a point closest to the specific pinhole of the first sub-pixel, and P4 is a point intersecting a sixth line segment and closest to the specific pinhole of a second sub-pixel, where the second sub-pixel is closest to the center of the specific pinhole in a plurality of sub-pixels of a same kind as a kind of the first sub-pixel adjacent to the first sub-pixel in a plan view of the second sub-pixel, and the sixth line segment passes through a point facing the center of the specific pinhole and the point 3.

3. The display device according to claim 2, wherein the plurality of microlenses are disposed side by side in a first direction and are disposed side by side in a second direction intersecting the first direction, and the plurality of pinholes are disposed side by side in a direction within a range of ±1.0° of the first direction; and are disposed side by side in a direction within a range of ±1.0° of the second direction.

4. The display device according to claim 3, further comprising a lens sheet that superimposes light having passed through the respective microlenses on one another, wherein an array pitch of the plurality of pinholes is equal to an array pitch of the plurality of microlenses.

5. The display device according to claim 3, wherein an array pitch of the plurality of pinholes is 1/n (where n is an integer of 2 or more) or 1/(n√2) of an array pitch of the plurality of microlenses.

6. The display device according to claim 4, wherein the pinhole mask, the microlens array, and the lens sheet are configured to superimpose light diffracted by the respective pinholes on one another to allow the light to have a diameter of 0.1 mm to 3 mm both inclusive at a predetermined position.

7. The display device according to claim 5, wherein the pinhole mask, the microlens array, and the lens sheet are configured to superimpose light diffracted by the respective pinholes on one another to allow the light to have a diameter of 0.1 mm to 3 mm both inclusive at a predetermined position.

8. The display device according to claim 3, wherein an array pitch of the plurality of pinholes is larger than an array pitch of the plurality of microlenses to allow light diffracted by the respective pinholes to be superimposed on one another at a pupil position of an eye of a user.

9. The display device according to claim 8, wherein the array pitch of the plurality of pinholes is 1/n (where n is an integer of 2 or more) or 1/(n√2) of the array pitch of the plurality of microlenses.

10. The display device according to claim 8, wherein the pinhole mask and the microlens array are configured to superimpose light diffracted by the respective pinholes on each other to allow the light to have a diameter of 0.1 ruin to 3 mm both inclusive at a predetermined position.

11. The display device according to claim 2, wherein
the display panel includes a light-transmissive protective glass or protective film on an outermost surface on the optical sheet side of the display panel, and
the optical sheet is bonded to the outermost surface on the optical sheet side.

12. The display device according to claim 11, wherein the optical sheet includes an electrically-charged film charged with static electricity, and the optical sheet is bonded to the outermost surface on the optical sheet side with use of the static electricity of the electrically-charged film.

13. The display device according to claim 11, further comprising an adhesive layer or a pressure-sensitive adhesive layer that bonds the optical sheet and the protective glass or the protective film together.

14. An electronic apparatus provided with a display device, the display device comprising:
a display panel including a plurality of display pixels that each include a plurality of sub-pixels; and
an optical sheet provided at a position facing the plurality of display pixels,
wherein the optical sheet includes
a pinhole mask including a plurality of pinholes that have a diffraction effect with respect to light emitted from the display pixels, and
a microlens array including a plurality of microlenses,
wherein a member having a scattering or diffusion action is not provided in an optical path of light emitted from each of the sub-pixels, and positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses, and
wherein the positions and sizes of the plurality of pinholes and the plurality of microlenses satisfy the following expression (1), $$\theta 1 > \theta 2 \quad (1)$$

where θ1 is an angle between a first line segment passim through a center of the specific pinhole and a point P1 and a second line segment passing through the center of the specific pinhole and a center of the specific microlens, θ2 is an angle between a third line segment passing through the center of the specific pinhole and a point P2 and the second line segment, P1 is a point furthest from the specific pinhole of a first sub-pixel farthest from the center of the specific pinhole in the sub-pixels of all kinds closest to the specific pinhole, and P2 is an end of the specific microlens.

15. An optical sheet suitable to be bonded to a display surface of a display panel, the display panel including a plurality of display pixels and the display surface, the plurality of display pixels each including a plurality of sub-pixels, the display surface being provided at a position facing the plurality of display pixels, the optical sheet comprising:

a pinhole mask including a plurality of pinholes that have a diffraction effect with respect to light emitted from the display pixels; and a microlens array including a plurality of microlenses, wherein a member having a scattering or diffusion action is not provided in an optical path of light emitted from each of the sub-pixels in a state in which the optical sheet is bonded to the display surface, and positions and sizes of the plurality of pinholes and the plurality of microlenses allow light emitted from each of the sub-pixels of all kinds to enter a specific pinhole that is common one of the pinholes and be diffracted by the specific pinhole, thereby allowing each thus-diffracted light outputted from the specific pinhole to enter a specific microlens that is one of the microlenses, and wherein the positions and sizes of the plurality of pinholes and the plurality of microlenses satisfy the following expression (1), $$\theta_1 > \theta_2 \qquad (1)$$

where θ1 is an angle between a first line segment passing through a center of the specific pinhole and a point P1 and a second line segment passing through the center of the specific pinhole and a center of the specific microlens, θ2 is an angle between a third line segment passing through the center of the specific pinhole and a point P2 and the second line segment, P1 is a point farthest from the specific pinhole of a first sub-pixel farthest from the center of the specific pinhole in the sub-pixels of all kinds closest to the specific pinhole, and P2 is an end of the specific microlens.

* * * * *